United States Patent
Wang et al.

(10) Patent No.: US 11,394,902 B2
(45) Date of Patent: Jul. 19, 2022

(54) SPARSE INFRARED PIXEL DESIGN FOR IMAGE SENSORS

(71) Applicant: QUALCOMM Incorporated, San Diego, CA (US)

(72) Inventors: Jing Wang, Milpitas, CA (US); Xiaoyun Jiang, San Diego, CA (US); Shang-Chih Chuang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/827,208

(22) Filed: Mar. 23, 2020

(65) Prior Publication Data

US 2021/0297607 A1   Sep. 23, 2021

(51) Int. Cl.
*H04N 5/33* (2006.01)
*H04N 9/04* (2006.01)

(52) U.S. Cl.
CPC ......... *H04N 5/332* (2013.01); *H04N 9/04515* (2018.08)

(58) Field of Classification Search
CPC ............... H04N 5/332; H04N 9/04515; H04N 5/36961; H04N 9/04553
USPC ........................................................ 348/164
See application file for complete search history.

(56) References Cited

U.S. PATENT DOCUMENTS

| | | | | |
|---|---|---|---|---|
| 6,759,646 | B1 * | 7/2004 | Acharya | H04N 5/332 250/226 |
| 2015/0287766 | A1 * | 10/2015 | Kim | H01L 27/14641 250/208.1 |
| 2019/0141238 | A1 * | 5/2019 | Zhou | H04N 5/332 |
| 2019/0363118 | A1 * | 11/2019 | Berkovich | H04N 5/345 |
| 2020/0288074 | A1 * | 9/2020 | Hanwell | H04N 5/3675 |

* cited by examiner

*Primary Examiner* — Kathleen V Nguyen
(74) *Attorney, Agent, or Firm* — Procopio, Cory, Hargreaves & Savitch LLP

(57) ABSTRACT

The present disclosure relates to methods and apparatus for image processing. For example, disclosed techniques facilitate a sparse infrared pixel design for image sensors. Aspects of this disclosure include an image sensor including a pattern of pixels, the pattern of pixels including a set of visible light pixels and a set of infrared light pixels. The image sensor may be configured to generate visible light data and infrared light data based on received light. Aspects of the present disclosure also include a processor coupled to the image sensor. The processor may be configured to generate a configurable mask based on the pattern of pixels of the image sensor, and where values of the configurable mask correspond to pixel locations of the image sensor.

30 Claims, 12 Drawing Sheets

SPARSE INFRARED PIXEL DESIGN FOR IMAGE SENSORS

TECHNICAL FIELD

The present disclosure relates generally to processing systems and, more particularly, to one or more techniques for image processing.

INTRODUCTION

Image capture devices, such as digital cameras and mobile devices (e.g., smartphones, tablets, laptops, etc.) include an imaging system that includes an image sensor positioned downstream of one or more optical components. Typical optical components may include one or more lenses and apertures. The optical components direct light of an image onto the image sensor, which measures the light. A processor processes the measurements made by the image sensor to record an image. To record a clear image, the optical components focus light from the image onto the image sensor.

Some image capture devices use different image sensors to perform different functionalities. Some image capture devices use a combined image sensor to perform the different functionalities. There is currently a need to improve color reproduction technology, including technology implemented with a combined image sensor.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. An example apparatus for image processing may include an image sensor including a set of visible light pixels and a set of infrared (IR) light pixels. The image sensor may be configured to generate visible light data and IR light data based on received light. The example apparatus may also include a processor coupled to the image sensor and configured to generate a configurable mask based on the pattern of pixels of the image sensor, wherein values of the configurable mask correspond to pixel locations of the image sensor.

In some examples, the processor may be configured to generate the configurable mask by setting a first value for pixel locations corresponding to the set of visible light pixels, and setting a second value for pixel locations corresponding to the set of infrared light pixels.

In some examples, the apparatus may further include an optical system for receiving the light. The optical system may include a dual band pass filter including a first band configured to allow visible light to pass through the optical system to the image sensor and a second band configured to allow infrared light to pass through the optical system to the image sensor.

In some examples, the processor may be further configured to receive the visible light data and the infrared light data from the image sensor for a frame. The processor may be further configured to identify pixel locations of the image sensor associated with missing visible light data based on the configurable mask. Additionally, the processor may be configured to generate, based on the visible light data and a red, green, blue (RGB) pattern, one of red data, green data, or blue data for each of the identified pixel locations of the image sensor.

In some examples, the RGB pattern may be one of a Bayer pattern or a Quadra pattern.

In some examples, the processor may be configured to generate the red data, the green data, or the blue data based on interpolation of corresponding visible light data from at least two neighboring visible light pixels.

In some examples, the processor may be configured to generate an RGB image for the frame based on the visible light data and the generated red data, green data, or blue data.

In some examples, the processor may be configured to generate an infrared image for the frame based on the infrared light data.

In some examples, the processor may be configured to remove infrared light contamination from the visible light data before generating the red data, the green data, or the blue data for the identified pixel locations of the image sensor.

In some examples, the image sensor may further include a set of phase detection pixels, and the image sensor may be further configured to generate phase detection data based on the received light.

In some examples, the processor may be configured to generate the configurable mask by setting a first value for pixel locations corresponding to the set of visible light pixels, setting a second value for pixel locations corresponding to the set of infrared light pixels, and setting a third value for pixel locations corresponding to the set of phase detection pixels.

In some examples, the second value and the third value may be the same value.

In some examples, the second value and the third value may be different values.

In some examples, the processor may be further configured to receive the visible light data, the infrared light data, and the phase detection data from the image sensor for a frame. The processor may be further configured to identify pixel locations of the image sensor associated with missing visible light data based on the configurable mask. Additionally, the processor may be configured to generate, based on the visible light data and a red, green, blue (RGB) pattern, one of red data, green data, or blue data for each of the identified pixel locations of the image sensor.

In some examples, the processor may be configured to generate an RGB image for the frame based on the visible light data, the phase detection data, and the generated red data, green data, or blue data corresponding to identified pixel locations associated with the set of infrared light pixels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

FIG. 9A is a second example spectral pattern, in accordance with certain aspects of this disclosure.

FIG. 9B is a second example infrared location mask corresponding to the second example spectral pattern of FIG. 9A, in accordance with certain aspects of this disclosure.

FIG. 10A is a third example spectral pattern, in accordance with certain aspects of this disclosure.

FIG. 10B is a third example infrared location mask corresponding to the third example spectral pattern of FIG. 10A, in accordance with certain aspects of this disclosure.

FIG. 11A is a fourth example spectral pattern, in accordance with certain aspects of this disclosure.

FIG. 11B is a fourth example infrared location mask corresponding to the fourth example spectral pattern of FIG. 11A, in accordance with certain aspects of this disclosure.

DETAILED DESCRIPTION

Figure 1:
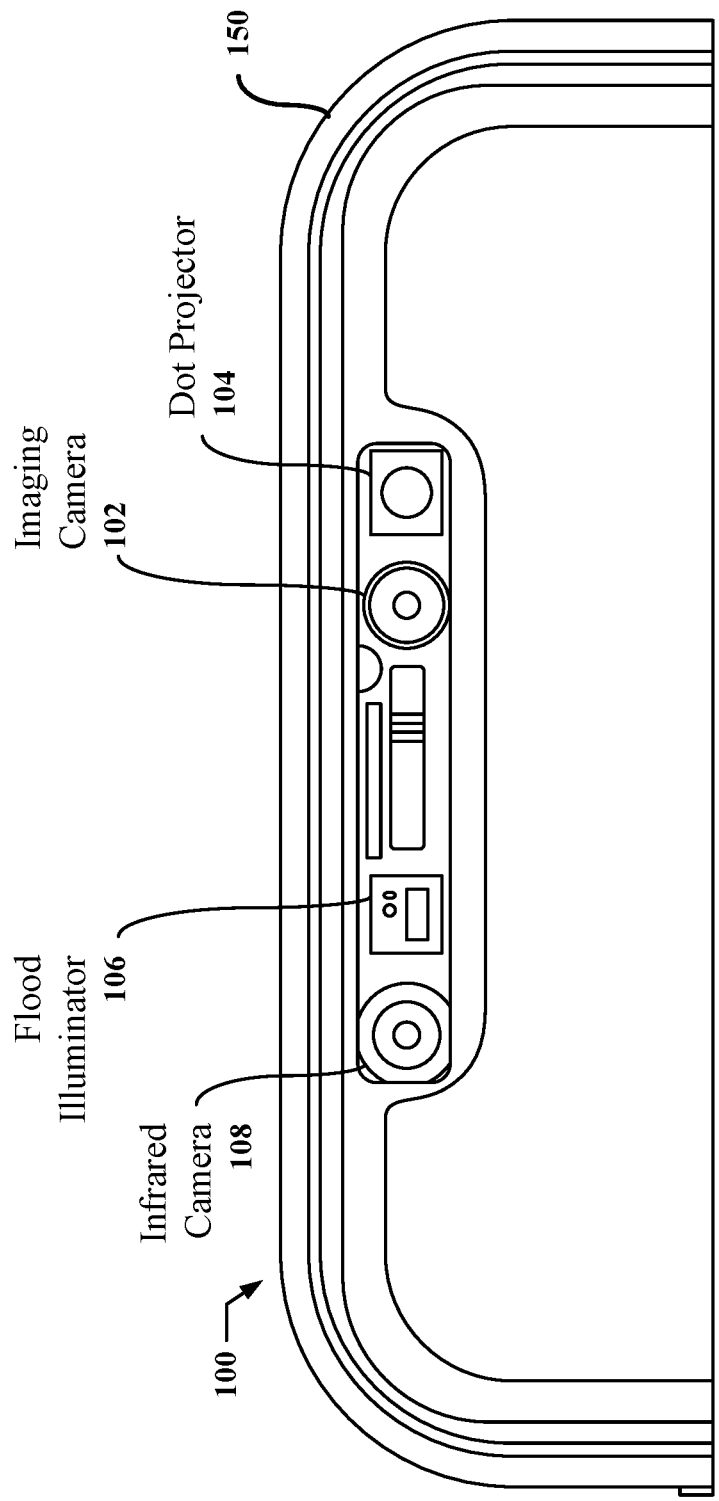
FIG. 1 illustrates an example image capture device of a mobile device, in accordance with certain aspects of this disclosure.

In general, examples disclosed herein provide techniques for improving visual quality of images captured via an image sensor. For example, example techniques disclosed herein provide an image sensor configured with a plurality of visible light pixels (also referred to as "imaging pixels") that are arranged in a spectral pattern that is configured to generate an image mosaic that is compatible with demosaicing components and without having to perform remosaicing techniques to convert the image mosaic into a different image mosaic that is compatible with the demosaicing components. Furthermore, as the density of infrared pixels of the image sensor is relatively sparse (e.g., less than a threshold density), the visible light spectral values of the image mosaic that are missing from the respective locations of the infrared pixels may be generated via pixel correction techniques that are relatively less resource (e.g., computationally, hardware, etc.) intensive than performing remosaicing techniques. Additionally, the locations of the missing visible light spectral values may be determined using a configurable mask that is configured based on a pattern of pixels of the image sensor. It should be appreciated that performing the pixel correction techniques for sparsely distributed pixel locations may be relatively less resource intensive than converting a first image mosaic associated with a first spectral pattern to a second image mosaic that is associated with a second spectral pattern.

Various aspects of systems, apparatus, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatus, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, image signal processors (ISPs), graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (e.g., software) being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Mobile devices or portable devices, such as smartphones, tablets, laptops, etc., may include a visible light image sensor (e.g., a red, green, blue (RGB) sensor) and an infrared (or near-infrared) light image sensor. In some examples, the infrared light image sensor (or infrared camera) may be used to facilitate biometric authentication, to facilitate 3D mapping, to facilitate image Bokeh, etc. FIG. 1 illustrates an example image capture device 100 of a mobile device 150. The example image capture device 100 includes at least an imaging camera 102, a dot projector 104, a flood illuminator 106, and an infrared camera 108. The imaging camera 102 may facilitate capturing visible light and generating a visible light image. The dot projector 104 may facilitate projecting infrared dots onto a surface (e.g., a face, an iris, an object, etc.) to generate a map of the surface. The flood illuminator 106 (sometimes referred to as an "infrared flash" or an "infrared projector") may facilitate providing infrared light so that the surface may be read in relatively low-light environments. The infrared camera 108 may facilitate reading the dot pattern and capturing an infrared light image. In some examples, the infrared light image may be used to authenticate a person.

Figure 2:
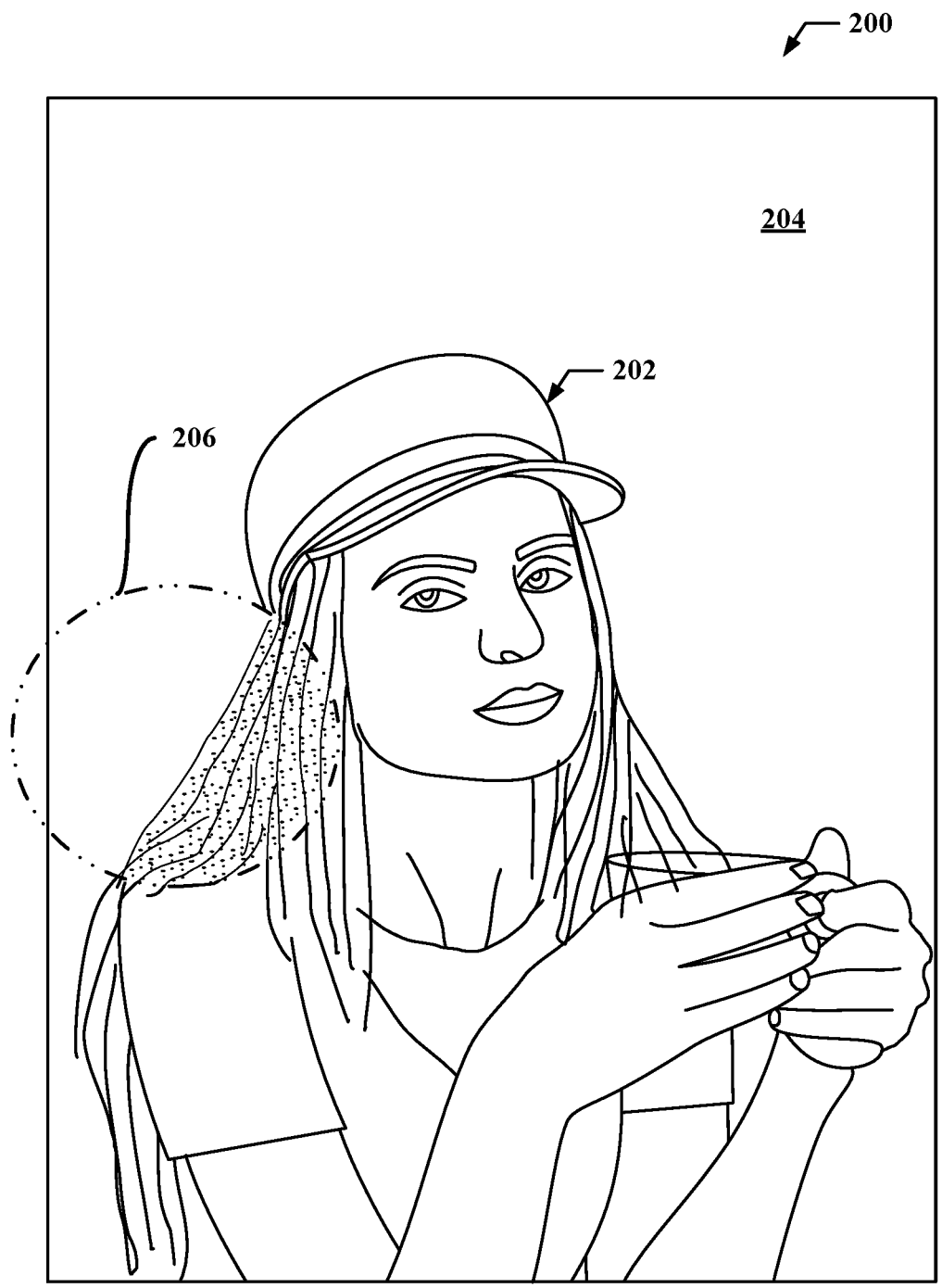
FIG. 2 depicts a visible light image including a person that is in focus, in accordance with certain aspects of this disclosure.

In some examples, the dot projector 104, the flood illuminator 106, and the infrared camera 108 may be used to facilitate capturing depth information of an environment, which may be used to facilitate 3D mapping of the environment. In some examples, the depth information may improve the performance of image Bokeh by removing visible artifacts, for example, at the border of the focused object and the blurred portion of the image. For example, FIG. 2 depicts a visible light image 200 including a person 202 that is in focus. The visible light image 200 also includes a blurred background 204. In the illustrated example of FIG. 2, a border region 206 between hair of the person 202 and the blurred background 204 may include artifacts without depth information captured by, for example, the dot projector 104, the flood illuminator 106, and the infrared camera 108.

While including a dedicated infrared light image sensor may be useful, it should be appreciated that there is a cost associated with including separate image sensors. For example, including two cameras (e.g., an imaging camera and an infrared camera) in the mobile device uses physical space and consumes processing resources to calibrate, among other costs.

Thus, some mobile devices include a single combined image sensor that can be used to capture visible light and/or infrared light for an image. For example, the mobile device may include an RGBIR sensor to capture light at visible wavelengths and/or infrared wavelengths and to output RGB information (e.g., visible light data) and/or IR information (e.g., infrared light data). The RBGIR sensor may include a dual band pass filter having a first band that is configured to allow visible light to pass through to the RGBIR sensor and a second band that is configured to allow infrared light to pass through to the RGBIR sensor. In some examples, the second band may allow passage of a relatively narrow range of infrared wavelengths. Accordingly, a single image sensor may be used to capture image data in both visible and infrared wavelengths, for example, generating an RGB image and an infrared image.

Figure 3B:
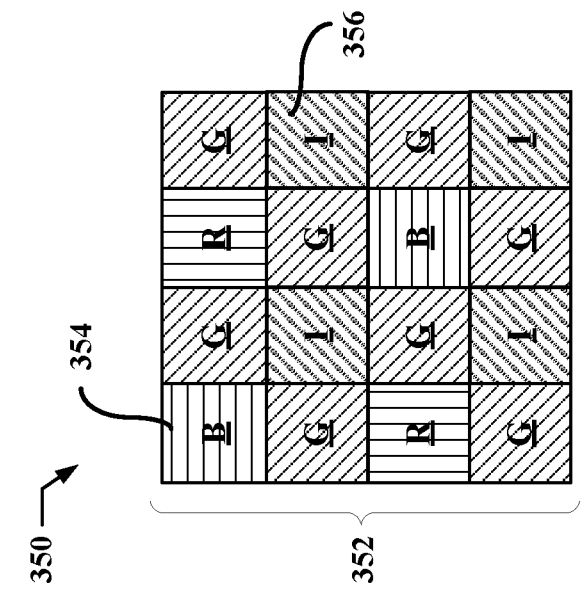
FIG. 3B illustrates an example image sensor for capturing visible light wavelengths and infrared light wavelengths, in accordance with certain aspects of this disclosure.
Figure 3A:
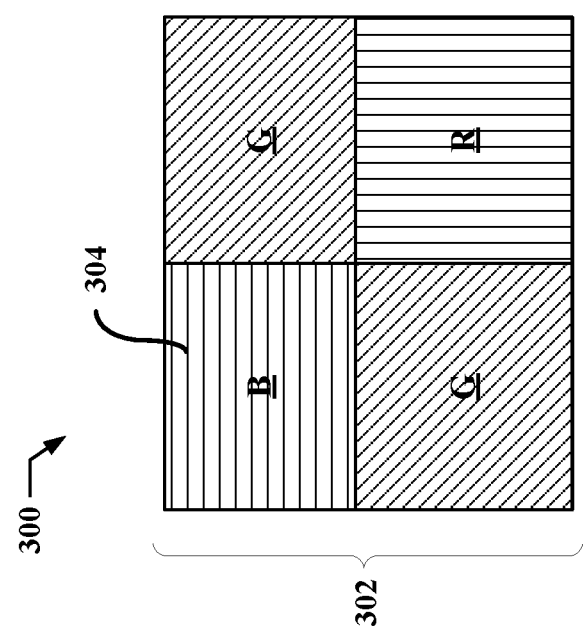
FIG. 3A illustrates an example image sensor for capturing visible light wavelengths, in accordance with certain aspects of this disclosure.

FIG. 3A illustrates an example image sensor 300 for capturing visible light wavelengths. In the illustrated example of FIG. 3A, the image sensor 300 includes a pixel array 302 including a plurality of imaging pixels 304. The imaging pixels 304 may be associated with a color filter array that is arranged in a pattern according to their colors. As used herein, the imaging pixels 304 may be referred to as a color type imaging pixels 304 based on the respective color of the color filter array associated with the respective imaging pixel. For example, the imaging pixels 304 may be referred to as red, green, and blue (R, G, and B, respectively, in FIG. 3A) type imaging pixels arranged in a Bayer pattern. In other examples, the color filter array associated with the imaging pixels 304 may be arranged in a cyan, yellow, green, and magenta pattern, a red, green, blue, and emerald pattern, a cyan, magenta yellow, and white pattern, a red, green, blue, and white pattern, or other suitable pattern corresponding to a demosaicing algorithm used to interpolate a set of red, green, and blue values for each imaging pixel 304. Although FIG. 3A illustrates the image sensor 300 with four imaging pixels 304 for ease of viewing, it should be appreciated that the image sensor 300 may have several million imaging pixels.

FIG. 3B illustrates an example image sensor 350 for capturing visible light wavelengths and infrared light wavelengths. In the illustrated example of FIG. 3B, the image sensor 350 includes a pixel array 352 including a plurality of imaging pixels 354 and a plurality of infrared pixels 356. The pixels 354, 356 may be associated with a color filter array that is arranged in a pattern according to their wavelength regions (e.g., a visible light color or infrared light). The imaging pixels 354 may be referred to as red, green, and blue (R, G, and B, respectively, in FIG. 3B) type pixels based on the respective color of the color filter array associated with the respective imaging pixel and arranged in a pattern along with the infrared pixels 356. However, it should be appreciated that additional or alternative examples may use other patterns for arranging the imaging pixels 354 and the infrared pixels 356 of the pixel array 352. Although FIG. 3B illustrates the image sensor 350 with sixteen pixels 354, 356 (e.g. a 4×4 pattern) for ease of viewing, it should be appreciated that the image sensor 350 may have several million pixels.

Figure 4:
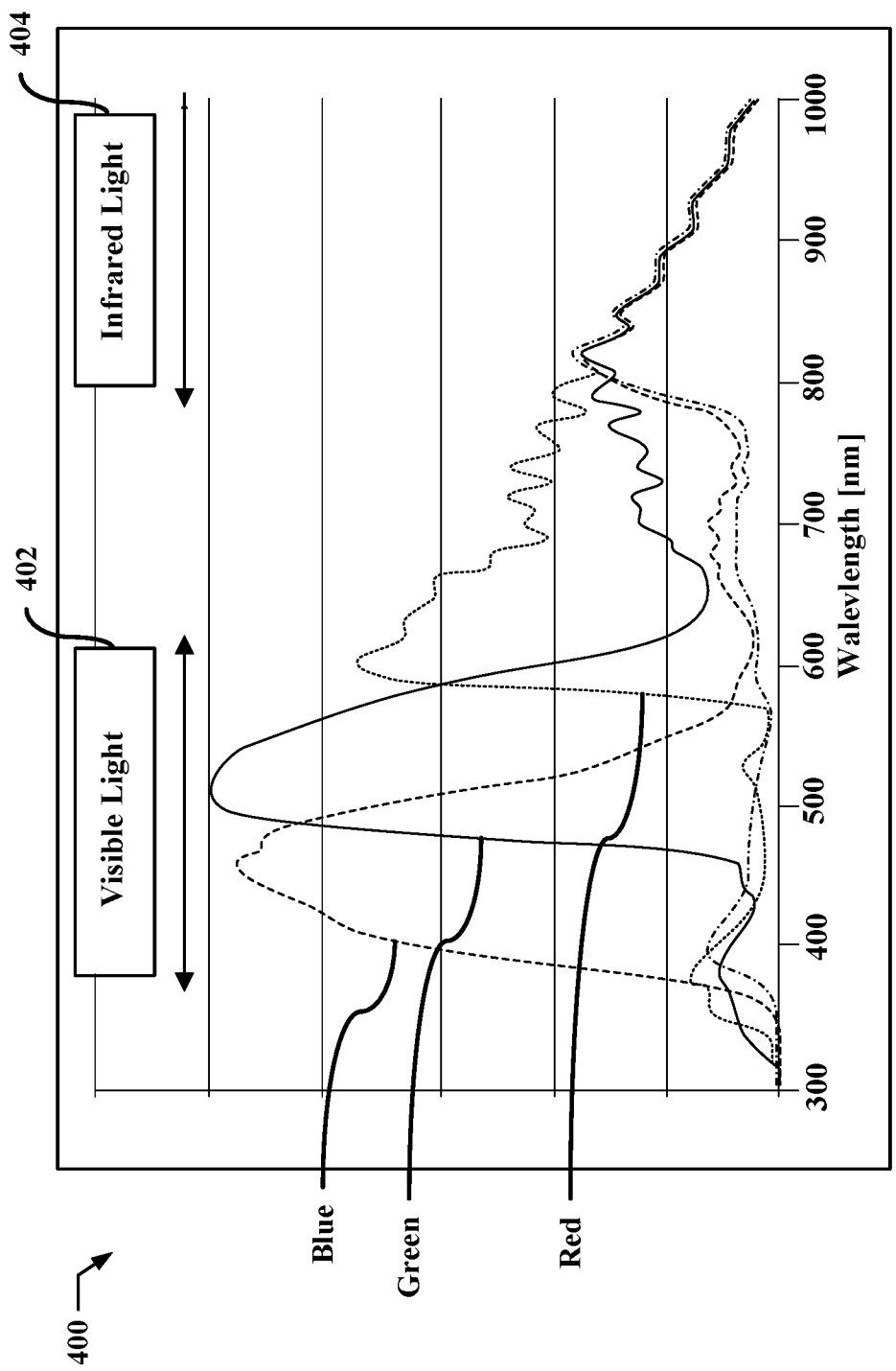
FIG. 4 illustrates an example graph depicting the regions of visible light and infrared light in relation to wavelength (nm), in accordance with certain aspects of this disclosure.

FIG. 4 illustrates an example graph 400 depicting the regions of visible light 402 and infrared light 404 in relation to wavelength (nm). For example, the graph 400 depicts the region of visible light 402, including the blue channel, the green channel, and the red channel, as approximately 380 nm to 750 nm. The example graph 400 also depicts the region of infrared light 404 as approximately greater than approximately 800 nm.

As used herein, infrared refers to the region of the electromagnetic spectrum ranging from wavelengths of approximately 800 nm to 900 nm (nanometers). However, it should be appreciated that infrared (or near-infrared) may refer to the region from wavelengths of 750 nm and 800 nm to approximately 2500 nm. The red, green, and blue channels of RGB image data, as used herein, refer to wavelength ranges roughly following the color receptors in the human eye. While the exact beginning and ending wavelengths that define colors of visible light (or infrared light) are not typically defined, it should be appreciated that the wavelengths ranging from around 750 nm to 380 nm are typically considered the "visible" spectrum. For example, a red channel of an RGB image may include wavelengths from approximately 625 nm to 740 nm. A green channel of an RGB image may include wavelengths from approximately 520 nm to 565 nm. A blue channel of an RGB image may include wavelengths from approximately 430 nm to 500 nm.

Figure 5:
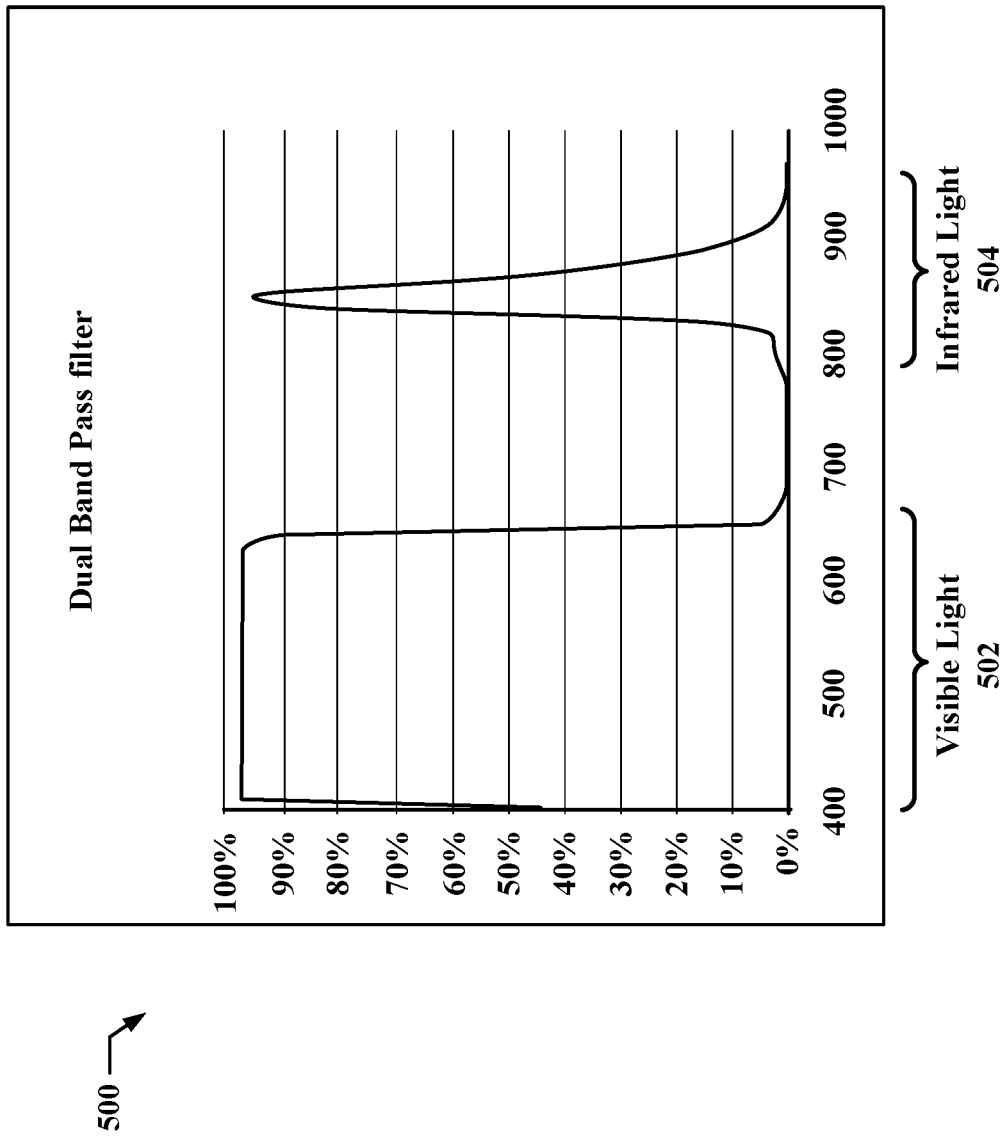
FIG. 5 illustrates an example graph depicting how much light may pass through a dual band-pass filter of an RGBIR sensor at different wavelengths.

FIG. 5 illustrates an example graph 500 depicting how much light may pass through a dual band pass filter of an RGBIR sensor at different wavelengths. For example, the graph 500 illustrates a visible light region 502 corresponding to a region allowing visible light to pass through to the RGBIR sensor and an infrared light region 504 corresponding to a region allowing infrared light to pass through to the RGBIR sensor.

However, as shown in FIGS. 4 and 5, it should be appreciated that in some examples, the RGB imaging pixels of the RGBIR sensor may collect infrared signals. In some examples, it may be difficult to determine, for example, how much energy of a blue channel is from the blue pixels of the RGBIR sensor and how much energy of the blue channel is from the infrared pixel. In some such examples, colors in an RGB image may be "contaminated" with the infrared signals. As a result, the colors depicted in an RGB image of a scene may be of relatively low accuracy compared to the colors of the scene.

Furthermore, it should be appreciated that an RGBIR sensor generates an RGBIR image mosaic that includes raw visible light data and raw infrared light data. Each pixel of the RGBIR sensor typically includes one kind of spectral filter (e.g., red, green, blue, infrared, etc.) that is arranged in a spectral filter array (sometimes referred to as a color filter array (CFA)). The photodiode(s) of each pixel capture metrics of the light spectrum associated with the spectral filter. For example, a pixel with a red spectral filter (sometimes referred to as a "red imaging pixel") will measure a red spectral value, a pixel with a green spectral filter (sometimes referred to as a "green imaging pixel") will measure a green spectral value, a pixel with a blue spectral filter (sometimes referred to as a "blue imaging pixel") will measure a blue spectral value, and a pixel with an infrared spectral filter (sometimes referred to as an "infrared pixel") will measure an infrared spectral value.

It should be appreciated that one or more processors of an image capture device may receive the respective spectral values (referred to herein as "raw data") from the image sensor. Because each pixel measures one spectral value (e.g., red, green, blue, or infrared), the received spectral values results in an RGBIR image mosaic where each pixel has one spectral value. In contrast, a multi-color image typically includes a plurality of spectral values to each pixel.

In some examples, to produce a multi-color image (sometimes referred to as an "RGB image" or a "visible light image"), the image capture device may be configured to perform demosaicing techniques to estimate (or interpolate) the missing spectral values for each pixel. For example, if a pixel includes a red spectral value, but is missing a blue spectral value and a green spectral value, the one or more processors of the image capture device may assign the missing blue spectral value and the missing green spectral value to the pixel using a demosaicing algorithm.

For example, to convert an RGBIR image mosaic into a multi-color image, the one or more processors may perform demosaicing techniques (sometimes referred to as "multi-channel interpolation" or "full-color interpolation"). In some such examples, the demosaicing techniques may include estimating missing spectral values of pixels based on known spectral values of one or more neighboring pixels. In some examples, the image capture device may perform the demosaicing techniques until each pixel includes a spectral value for each channel of a color space (e.g., until each pixel includes a red spectral value, a green spectral value, and a blue spectral value in an RGB color space).

However, it should be appreciated that since an image may include millions of pixels, performing the demosaicing techniques may be resource (e.g., computationally) intensive. To accelerate the performing of the demosaicing techniques, the image capture device may include special components (e.g., demosaicing components). The example demosaicing components may be specialized hardware (e.g., ASIC processors) and/or specialized software. However, some example demosaicing components may be compatible with image mosaics arranged in a particular spectral array. For example, the example demosaicing components may be compatible with image mosaics arranged in a Bayer pattern (as shown in FIG. 3A).

Some examples include performing remosaicing techniques on an image mosaic that is not compatible with the demosaicing components. In general, remosaicing can include converting a first mosaic of an image into a second mosaic of the image. For example, the first image mosaic may be arranged in a non-Bayer pattern and the second image mosaic may be arranged in the Bayer pattern.

However, performing the remosaicing techniques may also be resource (e.g., computationally) intensive. For example, every pixel of the first image mosaic may need to be processed to determine whether the spectral value for the respective value needs to be converted to a different spectral value. Furthermore, it should be appreciated that different remosaicing techniques may be needed for converting the first image mosaic to the second image mosaic based on the spectral pattern associated with the first image mosaic. For example, a first remosaicing technique may be associated with converting a 2×2 RGBIR spectral pattern to the Bayer pattern, a second remosaicing technique may be associated with converting a 4×4 RGBIR spectral pattern to the Bayer pattern, etc.

Accordingly, example techniques disclosed herein utilize an image sensor including a sparse infrared pixel density. For example, the image sensor includes a plurality of visible light pixels configured to receive visible light and to generate visible light data. The example image sensor also includes one or more infrared pixels configured to receive infrared light and to generate infrared light data. Disclosed examples employ infrared pixels that are sparsely distributed throughout the image sensor. As used herein, the term "sparsely" refers to examples when a density of infrared pixels is less than a threshold density. For example, the image sensor may include a first quantity of infrared pixels and a second quantity of visible light pixels. In some such examples, when the density of infrared pixels (e.g., a ratio of the first quantity of infrared pixels to the second quantity of visible light pixels) is less than a threshold density, the infrared pixels may be determined to be sparsely distributed at the image sensor. Furthermore, the visible light pixels may be distributed in a spectral pattern that is compatible with the demosaicing components. It should be appreciated that the threshold density may be any suitable ratio or percent, such as three percent, six percent, twelve percent, etc.

By including a sparse density of infrared pixels at the image sensor and using a compatible spectral pattern for generating the image mosaic (e.g., a spectral pattern that is compatible with the demosaicing components of the image capture device), it should be appreciated that the disclosed image mosaic received by the one or more processors of the image capture device is also compatible with the demosaicing components of the image capture device for generating a multi-color image. However, while the image mosaic may include missing visible light spectral values at locations corresponding to the infrared pixels of the image sensor, it should be appreciated that because the density of the IR pixels is relatively sparse (e.g., less than a threshold density, such as one of sixteen ($\frac{1}{16}$), one of sixty-four ($\frac{1}{64}$), etc.), the respective locations may be processed as pixels with missing visible light spectral values. For example, disclosed techniques may perform one or more pixel correction techniques based on, for example, nearest neighbor algorithms. For example, disclosed techniques may assign a spectral value for a pixel with a missing visible light spectral value based on an average spectral value of one or more pixel locations associated with the same spectral characteristic (e.g., a red pixel, a green pixel, or a blue pixel). In some examples, disclosed techniques may utilize estimating (or interpolating) a spectral value for a pixel with a missing visible light spectral value based on classifier classifications (e.g., gradient classifiers) and/or statistical measurements, such as variance and/or standard deviation of spectral values neighboring the respective pixel.

In some examples, disclosed techniques utilize an infrared location mask to determine the location of the one or more infrared pixels of the image sensor. For example, the infrared location mask may be a configurable mask that is based on the spectral pattern corresponding to the image sensor and, thus, the image mosaic generated by the image sensor. In some examples, when generating an image (e.g., an RGB image), disclosed techniques may use the infrared location mask to identify the pixel locations of the image sensor corresponding to the one or more infrared pixels. Disclosed techniques may then assign a spectral value (e.g., red, green, or blue) for the identified pixels to facilitate generating the image.

Accordingly, it should be appreciated that example techniques disclosed herein provide an image sensor configured with a plurality of visible light pixels (also referred to as "imaging pixels") that are arranged in a spectral pattern that is configured to generate an image mosaic that is compatible with demosaicing components and without having to perform remosaicing techniques to convert the image mosaic into a different image mosaic that is compatible with the demosaicing components. Furthermore, as the density of infrared pixels of the image sensor is relatively sparse (e.g., less than a threshold density), the visible light spectral values of the image mosaic that are missing from the respective locations of the infrared pixels of the image sensor may be generated via pixel correction techniques that are relatively less resource (e.g., computationally, hardware, etc.) intensive than performing remosaicing techniques. Additionally, the locations of the pixels with missing visible light spectral values may be determined using an infrared location mask that is configured based on the pattern of pixels (e.g., the arrangement of imaging pixels and infrared pixels) of the image sensor.

It should be appreciated that while the pattern of pixels of the image sensor may be fixed, the quantity and/or distribution of infrared pixels of the image sensor may depend on an application (or example use-case) of the image capture device. In some examples, the quantity or density of infrared pixels of the image sensor may vary based on a preferred resolution of the generated infrared image. For example, if an image sensor includes 32 million pixels and is configured with an infrared density of one in sixteen ($\frac{1}{16}$), then the resolution of the generated infrared image is 2 million infrared pixels. However, if an image sensor includes 64 million pixels and is configured with an infrared density of one in sixty-four ($\frac{1}{64}$), then the resolution of the generated infrared image is 1 million infrared pixels. Thus, it should be appreciated that in some examples, the density of infrared pixels of the image sensor may be selected based on the quantity of pixels of the image sensor and the preferred resolution of the generated infrared image.

Furthermore, it should be appreciated that the disclosed example image sensor (e.g., a sparse infrared image sensor) may be used in examples in which color inaccuracy due to infrared contamination (as described in connection with FIGS. 4 and 5) is acceptable for an application (or use-case). For example, it may be beneficial for an image capture device that may generate RGB images for color agnostic applications to employ the example sparse infrared image sensor disclosed herein. For example, an image capture device that typically generates RGB images in low-light environments may benefit from including such a sparse infrared image sensor.

It should be appreciated that in some examples, the image capture device may be configured to remove infrared contamination of visible light spectral values that may be generated by visible light pixels. For example, the image capture device may include one or more additional filters to reduce or remove infrared contamination for the visible light spectral values. For example, the image capture device may include a dual-band pass filter including a first band configured to allow visible light to pass through to the image sensor and a second band configured to allow infrared light to pass through to the image sensor. However, it should be appreciated that other example image capture devices may employ additional or alternative infrared contamination removal techniques for removing infrared contamination from generated visible light spectral values.

Although the following description may be focused on RGBIR image sensors (e.g., image sensors with a plurality of red pixels, green pixels, blue pixels, and infrared pixels), it should be appreciated that the concepts described herein may be applicable to other spectral patterns, such as a cyan, yellow, green, and magenta pattern, a red, green, blue, and emerald pattern, a cyan, magenta yellow, and white pattern, a red, green, blue, and white pattern, or other suitable pattern corresponding to a demosaicing algorithm used to interpolate a set of red, green, and blue values for each pixel of the image sensor. Additionally, the concepts described herein may be applicable to image sensors including one or more phase detection (or focus) pixels. For example, the image sensor may comprise a pattern of pixels including a set of visible light pixels, a set of infrared light pixels, and a set of phase detection pixels.

Figure 6:
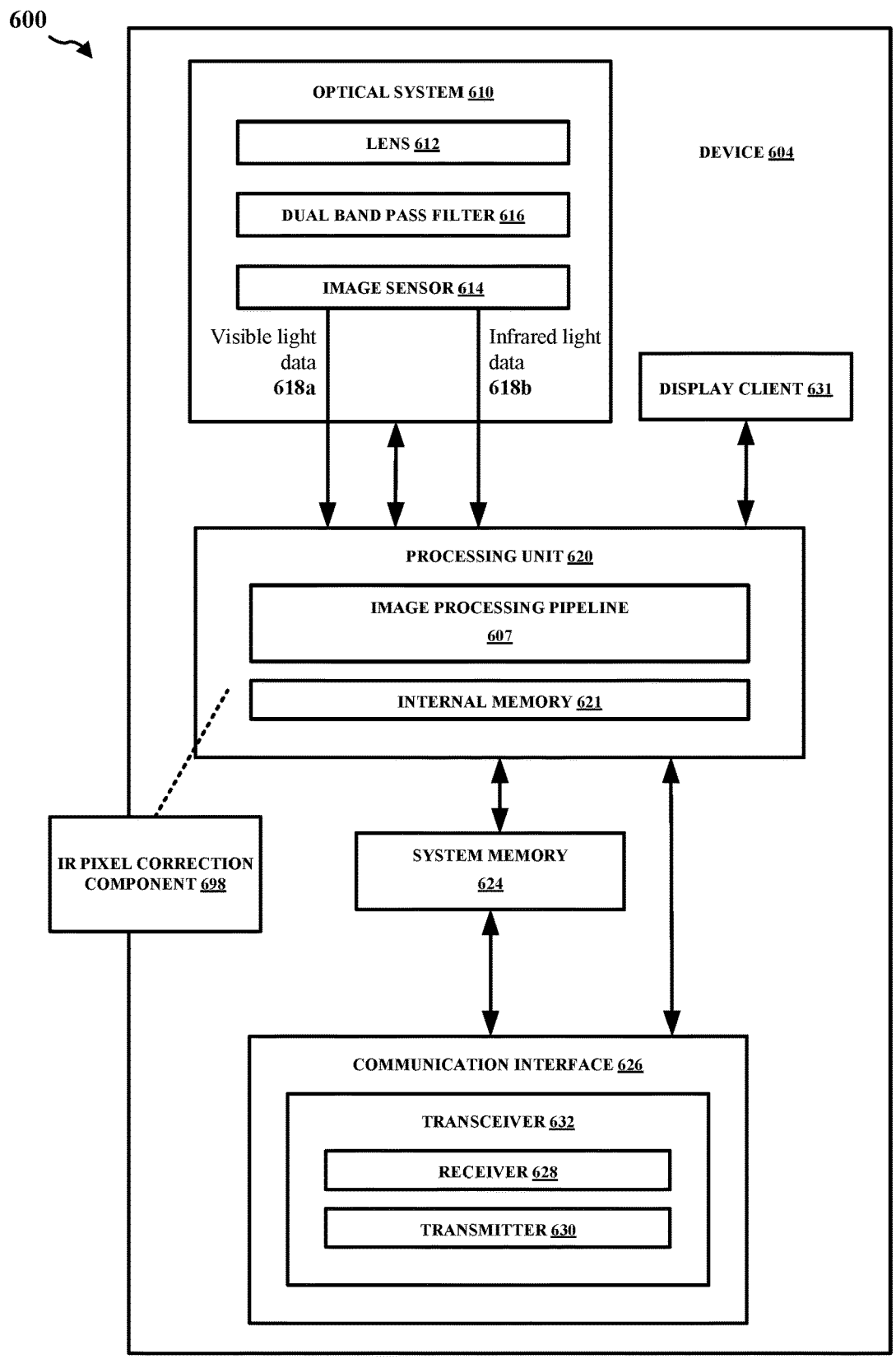
FIG. 6 is a block diagram of an example image capture device, in accordance with certain aspects of this disclosure.

FIG. 6 is a block diagram that illustrates an example content generation system 600 configured to implement one or more techniques of this disclosure. The content generation system 600 includes a device 604. The device 604 may include one or more components or circuits for performing various functions described herein. In some examples, one or more components of the device 604 may be components of an SOC. The device 604 may include one or more components configured to perform one or more techniques of this disclosure. In the example shown, the device 604 includes an optical system 610, a processing unit 620, and a system memory 624. In some examples, the device 604 can include any number of additional or alternative components, such as a communication interface 626 and a display client 631.

Although the example device 604 of FIG. 6 illustrates separate components to implement the processing unit 620 and the system memory 624, it should be appreciated that in other examples, the processing unit 620 and the system memory 624 may be combined in a variety of ways. For example, the system memory 624 may be combined with the processing unit 620 in a system on a chip (SOC).

In the illustrated example of FIG. 6, the processing unit 620 includes an internal memory 621. The processing unit 620 may be configured to perform image processing, such as in an image processing pipeline 607. For example, the image processing pipeline 607 may facilitate performing one or more image processing techniques on information generated by the optical system 610.

In some examples, the processing unit 620 facilitates controlling image capture functions, such as autofocus, auto-white balance, and/or auto-exposure. In some examples, the processing unit 620 may also facilitate performing post-processing functions, such as depth mapping and/or Bokeh effect. In some examples, the processing unit 620 may also facilitate performing cropping, scaling (e.g., to a different resolution), image stitching, image format conversion, color interpolation, color processing, image filtering (e.g., spatial image filtering), lens artifact or defect correction, sharpening, or the like.

In the illustrated example of FIG. 6, the processing unit 620 may be configured to control the display client 631 to display a captured image to a user. The example display client 631 may be external to the device 604 or may be part of the device 604. In some examples, the display client 631 may be configured to provide a view finder to facilitate displaying a preview image prior to capturing an image. The example display client 631 may include a liquid crystal display (LCD), a plasma display, a light emitting diode (LED) display, an organic LED (OLED) display, a projection display device, an augmented reality display device, a virtual reality display device, a head-mounted display, or any other type of display device. In some examples, the display client 631 may be touch sensitive and serve as an input device. In some examples, the device 604 may additionally or alternatively include one or more input devices, such as buttons, joy sticks, or the like.

It should be appreciated that in some examples, the display client 631 (sometimes referred to as a "display panel" or a "display") may include a display processor to facilitate the displaying of content.

Memory external to the processing unit 620, such as the system memory 624, may be accessible to the processing unit 620. For example, the processing unit 620 may be configured to read from and/or write to external memory, such as the system memory 624. In some examples, the processing unit 620 may write data to the system memory 624. The data may include data representing captured images and/or metadata (e.g., exchangeable image file format (EXIF) data). The processing unit 620 may be communicatively coupled to the system memory 624 over a bus. In some examples, the processing unit 620 and the system memory 624 may be communicatively coupled to each other over the bus or a different connection.

The internal memory 621 and/or the system memory 624 may be configured as any type of computer-readable medium. For example, the internal memory 621 and/or the system memory 624 can include RAM, SRAM, DRAM, erasable programmable ROM (EPROM), electrically erasable programmable ROM (EEPROM), flash memory, a magnetic data media or an optical storage media, or any other type of memory.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

Furthermore, the internal memory 621 and/or the system memory 624 may be a non-transitory storage medium according to some examples. The term "non-transitory" may indicate that the storage medium is not embodied in a carrier wave or a propagated signal. However, the term "non-transitory" should not be interpreted to mean that the internal memory 621 and/or the system memory 624 is non-movable or that its contents are static. As one example, the system memory 624 may be removed from the device 604 and moved to another device. As another example, the system memory 624 may not be removable from the device 604.

The processing unit 620 may be a central processing unit (CPU), an image signal processor (ISP), a graphics processing unit (GPU), a general purpose GPU (GPGPU), or any other processing unit that may be configured to perform image processing. In some examples, the processing unit 620 may be integrated into a motherboard of the device 604. In some examples, the processing unit 620 may be present on a graphics card that is installed in a port in a motherboard of the device 604, or may be otherwise incorporated within a peripheral device configured to interoperate with the device 604. The processing unit 620 may include one or more processors, such as one or more microprocessors, ISPs, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 620 may store instructions for the software in a suitable, computer-readable storage medium (e.g., the internal memory 621) and may execute the instructions in hardware using one or more processors to perform the techniques of this disclosure. Any of the foregoing, including hardware, software, a combination of hardware and software, etc., may be considered to be one or more processors.

In some examples, the device 604 may include the communication interface 626. The communication interface 626 may include a receiver 628 and a transmitter 630. The receiver 628 may be configured to perform any receiving function described herein with respect to the device 604. Additionally, the receiver 628 may be configured to receive information, e.g., eye or head position information, rendering commands, or location information, from another device. The transmitter 630 may be configured to perform any transmitting function described herein with respect to the device 604. For example, the transmitter 630 may be configured to transmit information to another device, which may include a request for content. The receiver 628 and the transmitter 630 may be combined into a transceiver 632. In such examples, the transceiver 632 may be configured to perform any receiving function and/or transmitting function described herein with respect to the device 604.

In the illustrated example of FIG. 6, the device 604 includes the optical system 610 to facilitate capturing images. The optical system 610 can be coupled to the processing unit 620 to transmit captured images and/or generated data (e.g., example image mosaics) to the processing unit 620.

The example optical system 610 of FIG. 6 includes a lens 612, an image sensor 614, and a dual band pass filter 616. The lens 612 may be a prime lens. The example lens 612 may facilitate focusing incoming light onto pixels of the image sensor 614. It should be appreciated that the lens 612 may include any number of optical elements.

The example image sensor 614 may be a complementary metal oxide semiconductor (CMOS) image sensor or a charge-coupled device (CCD) sensor. The example image sensor 614 includes a plurality of imaging pixels for capturing visible light data and one or more infrared pixels for capturing infrared light data.

The example dual-band pass filter 616 includes a first band configured to allow visible light to pass through the optical system 610 to the image sensor 614 and a second band configured to allow infrared light to pass through the optical system 610 to the image sensor 614. In some examples, the second band can allow passage of a narrow range of IR wavelengths matched to the emission wavelengths of, for example, an infrared flash (e.g., the example flood illuminator 106 of FIG. 1). Accordingly, a single sensor can be used to capture image data in both visible and IR wavelengths (as shown in connection with FIGS. 4 and 5) to, for example, facilitate the generating of an RGB image and an infrared image.

Figure 7B:
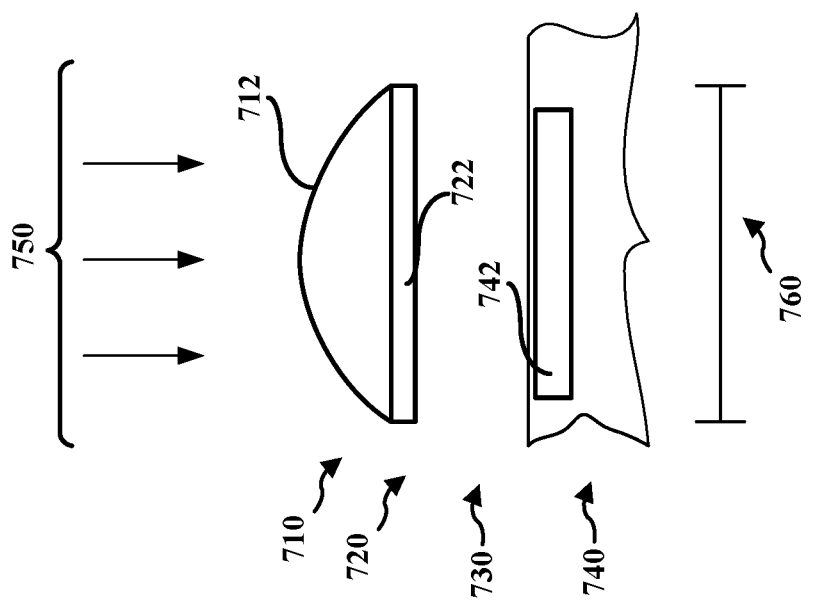
FIG. 7B is an exploded side view of a pixel of the image sensor of FIG. 7A, in accordance with certain aspects of this disclosure.
Figure 7A:
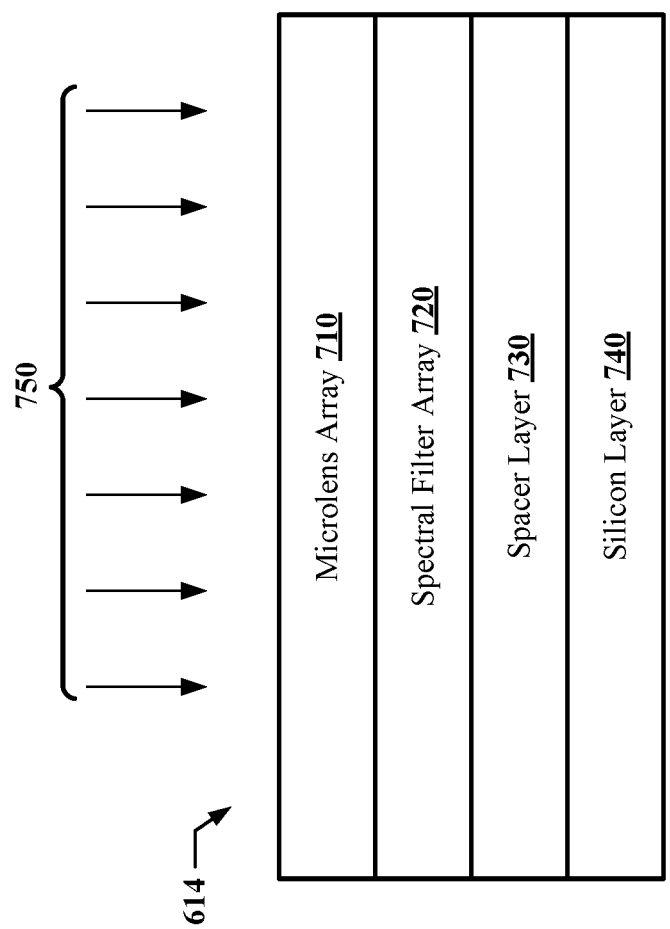
FIG. 7A illustrates an example cross-sectional side view of an example image sensor, in accordance with certain aspects of this disclosure.

FIGS. 7A and 7B illustrate example means for capturing data including visible light data and infrared light data, in accordance with certain aspects of this disclosure. FIG. 7A illustrates an example cross-sectional side view of an example image sensor 614 suitable for use in the optical system 610 of FIG. 6. FIG. 7B is an exploded side view of a pixel 760 of the image sensor 614 of FIG. 7A.

In the illustrated example of FIG. 7A, the image sensor 614 includes a microlens array 710, a spectral filter array 720 (also referred to as a color filter array (CFA)), a spacer layer 730, and a silicon layer 740. FIG. 7A illustrates an example relative arrangement of the layers 710, 720, 730, 740. It should be appreciated that in some examples, the image sensor 614 may omit one or more of the layers 710, 720, 730, 740. For example, one or both of the microlens array 710 and the spacer layer 730 may be omitted from the image sensor 614. Furthermore, it should be appreciated that the relative order of the microlens array 710, the spectral filter array 720, and the spacer layer 730 may be different in other examples. FIG. 7A also illustrates light 750 that may be received at the image sensor 614 (e.g., via the lens 612 and the dual band pass filter 616 of the optical system 610).

FIG. 7B is an exploded cross-sectional view of the image sensor 614 of FIG. 7A. The microlens array 710 may include a plurality of domed microlenses 712. The spectral filter array 720 may include a plurality of spectral filters 722. The spacer layer 730 may be a void (e.g., an absence of material), a transparent hardened resin, and the like. The spacer layer 730 may support the spectral filter array 720. A plurality of photodiodes 742 may be formed into the silicon layer 740. FIG. 7B depicts an example pixel 760. The example pixel 760 includes a microlens 712, a spectral filter 722, a portion of the spacer layer 730, and one or more photodiodes 742.

It should be appreciated that the image sensor 614 may include a plurality of pixels 760 (e.g., millions of pixels). Each of the pixels 760 may include the same number of photodiodes 742 (e.g., one, two, four, eight, etc.) or may include varying quantities of photodiodes.

FIGS. 8A, 9A, 10A, and 11A illustrate example spectral patterns that may be used with the example image sensor 614. Although the following description focuses on visible light pixels that include red pixels, green pixels, and blue pixels (R, G, and B, respectively), it should be appreciated that in some examples, the pixels may be arranged using other suitable patterns, such as a cyan, yellow, green, and magenta pattern, a red, green, blue, and emerald pattern, a cyan, magenta, yellow, and white pattern, a red, green, blue, and white pattern, or other suitable pattern corresponding to a demosaicing algorithm used to interpolate a set of red, green, and blue values for each pixel.

Figure 8B:
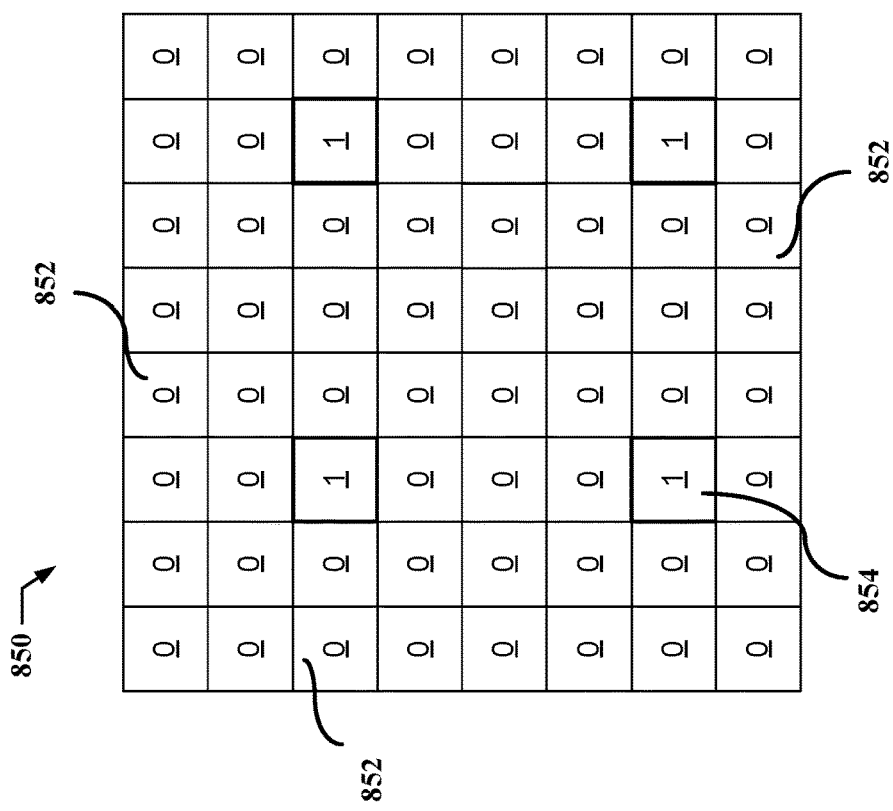
FIG. 8B is a first example infrared location mask corresponding to the first example spectral pattern of FIG. 8A, in accordance with certain aspects of this disclosure.
Figure 8A:
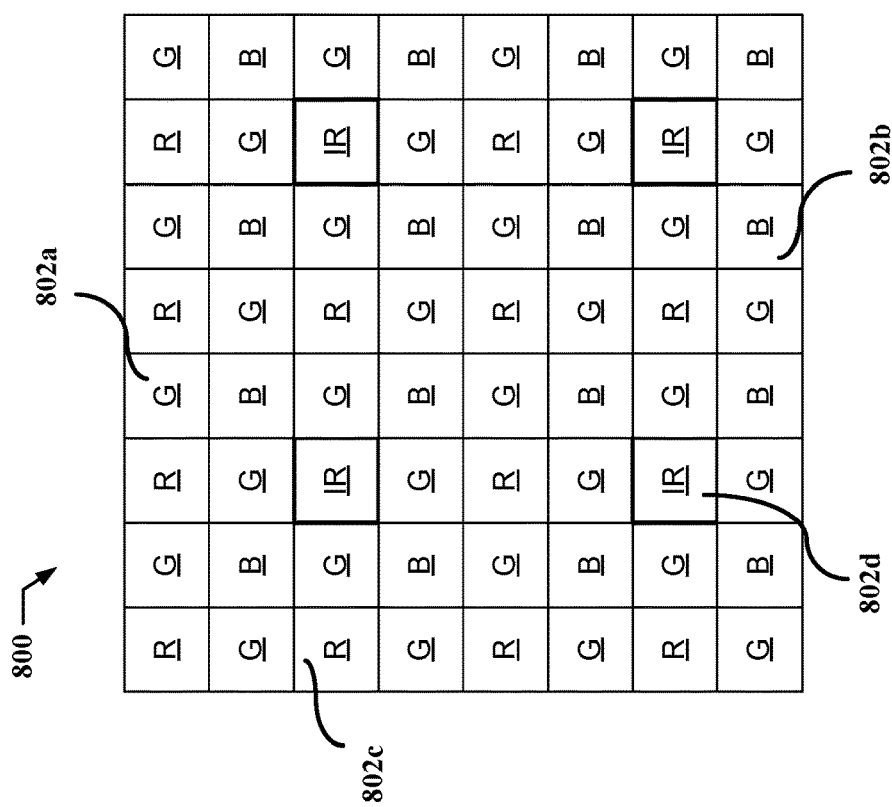
FIG. 8A is a first example spectral pattern, in accordance with certain aspects of this disclosure.
Figures 9A, 9B:
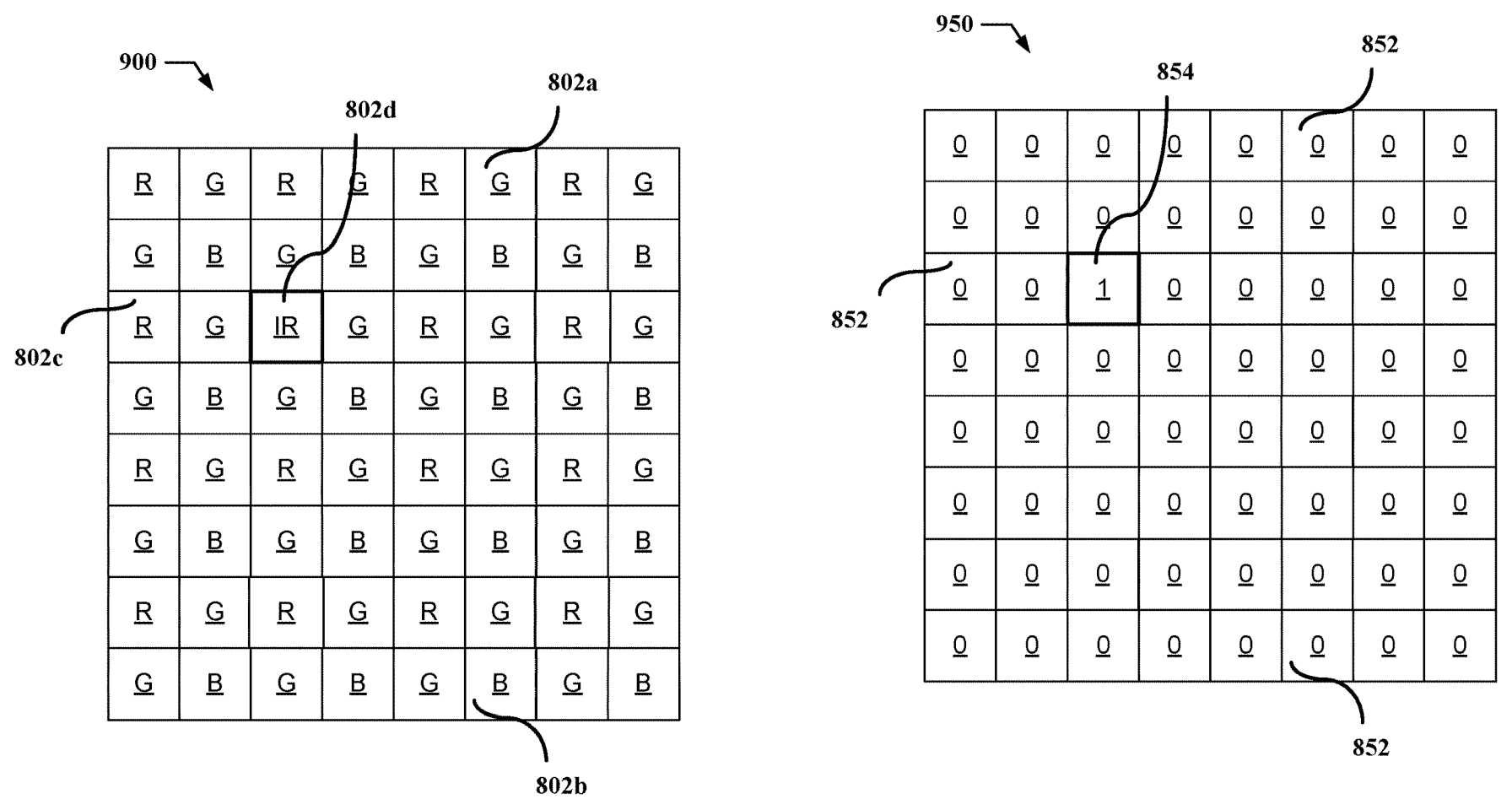
Figures 10A, 10B:
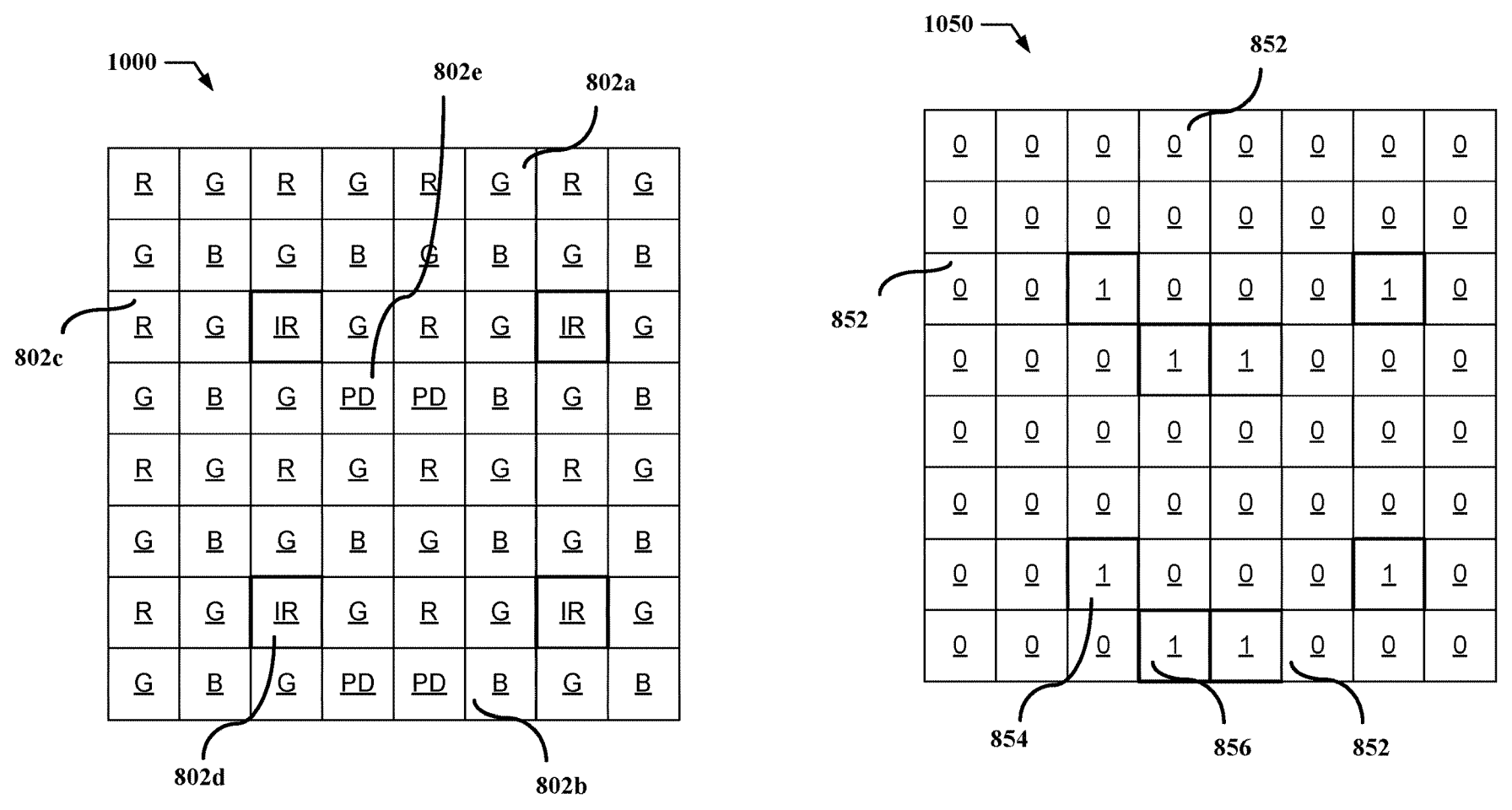
Figures 11A, 11B:
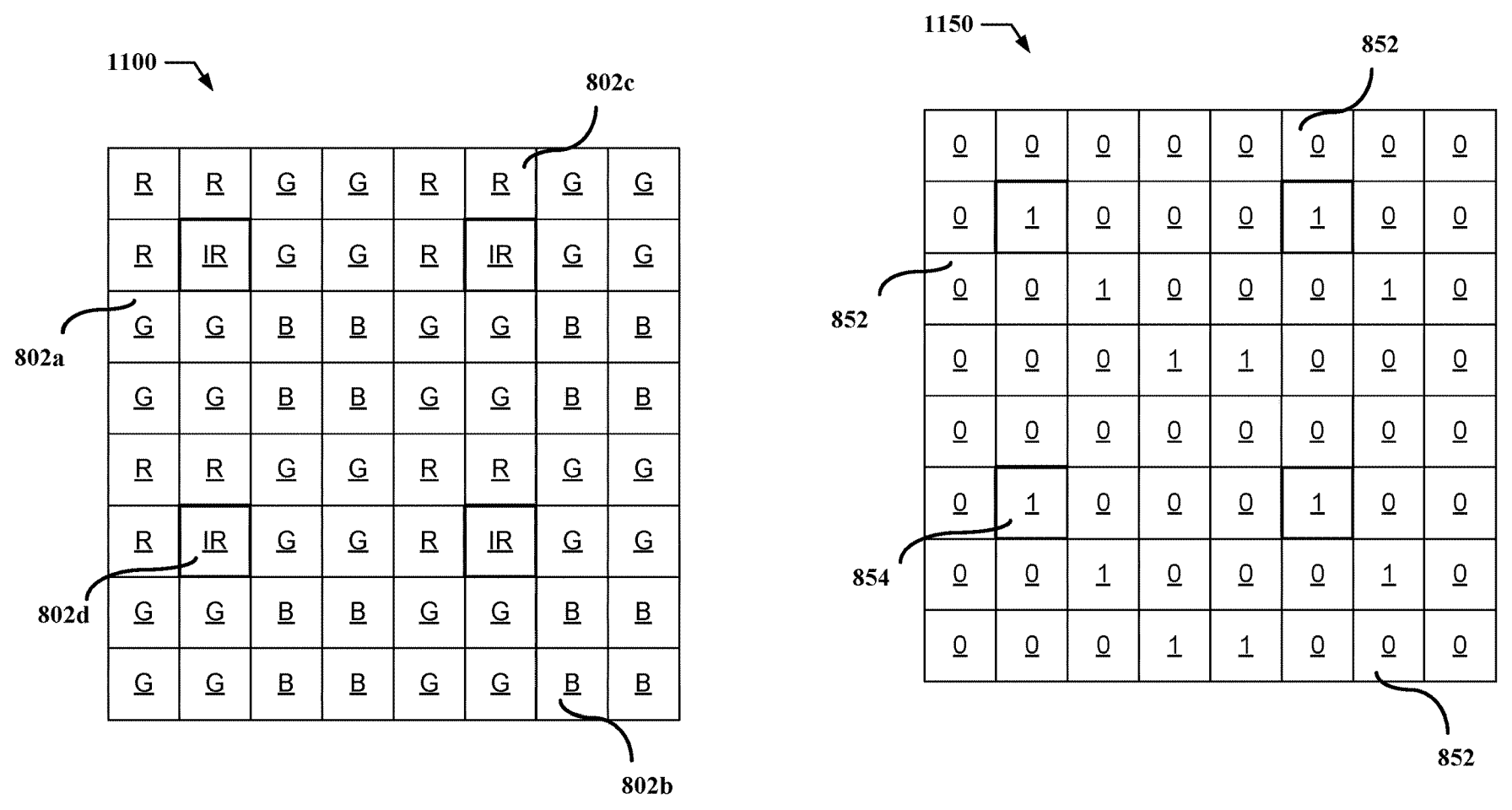

FIG. 8A illustrates a first example spectral pattern 800 that is arranged in a Bayer pattern. FIG. 9A illustrates a second example spectral pattern 900 that is arranged in a Bayer pattern. FIG. 10A illustrates a third example spectral pattern 1000 that is arranged in a Bayer pattern. FIG. 11A illustrates a fourth example spectral pattern 1100 that is arranged in a Quadra pattern. The example spectral patterns 800, 900, 1000, 1100 may match the spectral pattern of the spectral filter array 720 and/or the spectral pattern of an image mosaic.

In the illustrated examples, each spectral pattern 800, 900, 1000, 1100 includes a plurality of spectral units 802. As used herein, a spectral unit may represent a spectral filter or a spectral characteristic of a pixel. For example, the spectral units 802 can include green spectral units 802a, blue spectral units 802b, red spectral units 802c, infrared spectral units 802d, and phase detection spectral units 802e. Phase detection spectral units 802e can be any of the other spectral units 802a, 802b, 802c, and/or 802d. For example, the phase detection spectral units 802e can correspond to green pixels, blue pixels, red pixels, or infrared pixels. Furthermore, it should be appreciated that adjacent phase detection spectral units 802e can have the same spectral unit (e.g., both blue pixels, both green pixels, etc.).

In the illustrated examples, the Bayer spectral pattern of the spectral patterns 800, 900, 1000 are each characterized by repeating groups of four spectral units 802. For example, the Bayer spectral pattern includes two diagonal green spectral units 802a, one blue spectral unit 802b, and one red spectral unit 802c.

In the example of FIG. 11A, the Quadra spectral pattern of the fourth example spectral pattern 1100 is characterized by repeating a group of sixteen spectral units 802. For example, the Quadra spectral pattern includes eight green spectral units 802a arranged in two diagonal clusters of four (e.g., two clusters of 2×2 spectral units), four blue spectral units 802b arranged in a cluster of four (e.g., one cluster of 2×2 spectral units), and four red spectral units 802c arranged in a cluster of four (e.g., one cluster of 2×2 spectral units).

In the illustrated examples of FIGS. 8A, 9A, 10A, and 11A, the example spectral patterns 800, 900, 1000, 1100, respectively, include a plurality of infrared spectral units 802d. The example infrared spectral units 802d are distributed through each of the respective spectral patterns with a density that is less than a threshold density. For example, in FIG. 8A, the first example spectral pattern 800 includes a ratio of one infrared spectral unit 802d for every sixteen spectral units 802. That is, the first example spectral pattern 800 and corresponding image sensor 614 may be characterized as a Bayer pattern with an infrared density of one in sixteen (1/16). FIG. 9A depicts the second example spectral pattern 900 including a ratio of one infrared spectral unit 802d for every sixty-four spectral units 802. That is, the second example spectral pattern 900 of FIG. 9A and corresponding image sensor 614 may be characterized as a Bayer pattern with an infrared density of one in sixty-four (1/64).

FIG. 10A depicts the third example spectral pattern 1000 including a ratio of one infrared spectral unit 802d for every sixteen spectral units 802. That is, the third example spectral pattern 1000 may be characterized as a Bayer pattern with an infrared density of one in sixteen (1/16). The third example spectral pattern 1000 also includes one phase detection spectral unit 802e for every sixteen spectral units 802. It should be appreciated that the ratio of the quantity of phase detection spectral units 802e to the quantity of spectral units 802 may also be less than the threshold density.

FIG. 11A depicts the fourth example spectral pattern 1100 including a ratio of one infrared spectral unit 802d for every sixteen spectral units 802. That is, the fourth example spectral pattern 1100 may be characterized as a Quadra pattern with an infrared density of one in sixteen (1/16).

In the illustrated examples of FIGS. 8A, 9A, 10A, and 11A, each of the infrared densities is less than a threshold density (e.g., one in four (1/4)). Thus, each of the corresponding image sensors 614 may also be characterized as sparse infrared pixel image sensors. Furthermore, the phase detection density of the third example spectral pattern 1000 may also be less than the threshold density and, thus, the image sensor 614 corresponding to the third example spectral pattern 1000 may also be characterized as a sparse phase detection pixel image sensor. It should be appreciated that in some examples, the threshold density for determining whether the image sensor is a sparse infrared pixel image sensor and/or a sparse phase detection pixel image sensor may be the same. In other examples, the threshold density for determining whether the image sensor is a sparse infrared pixel image sensor may be different than the threshold density for determining whether the image sensor is a sparse phase detection image sensor.

In the illustrated examples, each spectral unit 802 may represent a spectral filter 722 of the spectral filter array 720. It should be appreciated that green spectral units 802a include green filters 722 that admit light within the green spectrum and block light falling outside of the green spectrum, that blue spectral units 802b include blue filters 722 that admit light within the blue spectrum and block light falling outside of the blue spectrum, and that red spectral units 802c include red filters 722 that admit light within the red spectrum and block light falling outside of the red spectrum.

Phase detection filters 722 may be any kind of filter (e.g., red, green, blue, or infrared). Each cluster of phase detection filters 722 (shown as a cluster of two in FIG. 10A) can be identified (e.g., all red, all green, all blue, or all infrared). Infrared filters 722 can admit light within the infrared spectrum (e.g., the infrared light region 504 of FIG. 5) and block light falling outside of the infrared spectrum. Each filter 722 can be broken into a plurality of discrete pieces or can have a unitary and integral structure.

As described above, each pixel 760 can include a filter 722 configured to admit a single spectral channel. For example, if the image sensor 614 includes the spectral filter array 720 based on the first example spectral pattern 800, then the pixels 760 with filters 722 corresponding to blue spectral units 802b capture blue light, but do not capture green light, red light, and infrared light.

Spectral filters 722 enable (e.g., allow or permit) the example processing unit 620 to produce a color image. For example, the example photodiodes 742 may not be capable of distinguishing between different spectrums of light. Instead, the example photodiodes 742 may capture the intensity of light over a window (e.g., an exposure window) of the optical system 610. The spectral filters 722 can facilitate the photodiodes of each pixel 760 to capture a single spectral channel (e.g., red, green, blue, or infrared). Thus, it should be appreciated that the example image mosaics generated by the image sensor 614 includes an array of spectral values corresponding to the spectral filter 722 of each respective pixel 760. That is, if a first pixel 760 is a red pixel, then the spectral value of the image mosaic corresponding to the location of the first pixel 760 is a red spectral value.

Referring again to FIG. 6, the example image sensor 614 outputs an image mosaic 618 based on the spectral values captured by the respective pixels 760 of the image sensor 614. The example image mosaic 618 includes visible light data 618a that may be generated by visible light pixels (e.g., the green pixels 802a, the blue pixels 802b, and the red pixels 802c). The example image mosaic 618 also includes infrared light data 618b that may be generated by infrared light pixels (e.g., the infrared pixels 802d).

The example processing unit 620 may be configured to perform image processing on the image mosaic 618 received from the image sensor 614. For example, the processing unit 620 may determine, for example, based on an application, whether to generate an RGB image or to generate an infrared image based on the image mosaic 618. For example, when color is beneficial for the image (e.g., when a color-sensitive application, such as generating a video or an animation, causes the generating of the image), the processing unit 620 may determine to generate an RGB image. In other examples in which infrared signals may be beneficial for the image (e.g., when a color agnostic application, such as biometric authentication, causes the generating of the image), the processing unit 620 may determine to generate an infrared image.

In some examples, when the processing unit 620 determines to generate an infrared image, the processing unit 620 may identify and process the infrared light data 618b of the image mosaic 618 to generate the infrared image. In some examples, the generated infrared image may have less resolution than the image mosaic 618. In some examples, the processing unit 620 may perform upscaling so that the generated infrared image may have the same resolution as the image mosaic 618.

In some examples, when the processing unit 620 determines to generate an RGB image, the processing unit 620 may first correct (or populate) certain spectral values of the image mosaic 618. For example, the processing unit 620 may include an IR pixel correction component 698 to correct (or replace) respective data of the image mosaic 618 based on spectral values of one or more neighboring pixel locations. For example, the IR pixel correction component 698 may perform pixel correction techniques to correct spectral values for certain locations of the image mosaic 618. As described above, the image mosaic 618 includes spectral values based on a spectral pattern that is compatible with demosaicing techniques and, thus, the IR pixel correction component 698 is able to populate any missing data (e.g., spectral values for pixel locations corresponding to infrared pixels that generate the infrared light data 618b) of the image mosaic 618 without performing any remosaicing techniques to convert the image mosaic 618 associated with a first spectral pattern to a different image mosaic associated with a second spectral pattern. That is, the spectral pattern associated with the image mosaic 618 is compatible with any RGB image generation techniques (e.g., demosaicing techniques).

In some examples, the IR pixel correction component 698 may be configured to receive the visible light data 618a and the infrared light data 618b from the image sensor 614. In some examples, the visible light data 618a and the infrared light data 618b may be received as the image mosaic 618 that is based on a spectral pattern.

The example IR pixel correction component 698 may also be configured to generate, based on the visible light data 618a, spectral values for pixel locations corresponding to the infrared pixels. In some examples, the IR pixel correction component 698 may generate the spectral values based on the spectral pattern associated with the image mosaic 618. For example, the IR pixel correction component 698 may determine the pixel locations corresponding to the infrared pixels based on an infrared location mask. In some examples, the infrared location mask may indicate the locations of the infrared pixels of the image sensor 614.

In some examples, the infrared location mask may be a configurable mask that is based on the pattern of pixels of the image sensor 614. By employing a configurable mask for identifying the pixel locations of the infrared pixels, the example IR pixel correction component 698 is able to use demosaicing techniques regardless of the density or arrangement of infrared pixels of the image sensor 614. For example, when an image sensor 614 is provided to (e.g., installed in) the device 604, the IR pixel correction component 698 may generate configurable mask based on the pattern of pixels (e.g., the imaging pixels and the one or more infrared pixels and/or one or more phase detection pixels) of the image sensor 614. In some examples, the IR pixel correction component 698 may generate the configurable mask by setting values of the configurable mask corresponding to pixel locations of the image sensor 614.

In some examples, the IR pixel correction component 698 may determine the locations of the visible light pixels and the locations of the infrared light pixels based on a data structure, such as a file, a table, a list, etc. For example, the data structure may correspond to the spectral patterns 800, 900, 1000, 1100 and indicate the locations of green pixels 802a, blue pixels 802b, red pixels 802c, infrared pixels 802d, and/or phase detection pixels 802e.

In some examples, the data structure may be provided with the image sensor 614. In some examples, the IR pixel correction component 698 may access the data structure, for example, via the communication interface 626. In some examples, the IR pixel correction component 698 may determine the locations of the visible light pixels and the locations of the infrared light pixels and populate the data structure. For example, the IR pixel correction component 698 may be configured to capture a first frame with the flood projector 106 enabled and capture a second frame with the flood projector 106 disabled. In some examples, the IR pixel correction component 698 may additionally or alternatively be configured to capture the first frame using a time-of-flight sensor enabled and to capture the second frame using the time-of-flight sensor disabled. The IR pixel correction component 698 may then compare the first frame and the second frame to determine the locations of the visible light pixels (e.g., the green pixels 802a, the blue pixels 802b, and the red pixels 802c) and the locations of the non-visible light pixels (e.g., the infrared pixels 802d and/or the phase detection pixels 802e) of the image sensor 614.

The example IR pixel correction component 698 may then set a first value for pixel locations that correspond to visible light pixels (e.g., the green pixels 802a, the blue pixels 802b, and the red pixels 802c). The example IR pixel correction component 698 may set a second value for pixel locations that correspond to non-visible light pixels (e.g., the infrared pixels 802d and/or the phase detection pixels 802e). In some examples, the IR pixel correction component 698 may set different values for the infrared pixels 802d and the phase detection pixels 802e. For example, the IR pixel correction component 698 may set a third value for pixel locations that correspond to the phase detection pixels 802e that is different than the second value corresponding to the infrared pixels 802d.

For example, FIG. 8B illustrates a first infrared location mask 850 that corresponds to the first example spectral pattern 800 of FIG. 8A. For example, the first infrared location mask 850 includes a first value (e.g., a "0") to indicate locations 852 of visible light pixels (e.g., the green pixel 802a, the blue pixels 802b, and the red pixels 802c). The first infrared location mask 850 also includes a second value (e.g., a "1") to indicate locations 854 of infrared light pixels (e.g., the infrared pixels 802d).

FIG. 9B illustrates a second infrared location mask 950 that corresponds to the second example spectral pattern 900 of FIG. 9A. Similar to the first infrared location mask 850, the second infrared location mask 950 includes a first value (e.g., a "0") to indicate locations 852 of visible light pixels (e.g., the green pixel 802a, the blue pixels 802b, and the red pixels 802c). The second infrared location mask 950 also includes a second value (e.g., a "1") to indicate locations 854 of infrared light pixels (e.g., the infrared pixels 802d).

FIG. 10B illustrates a third infrared location mask 1050 that corresponds to the third example spectral pattern 1000 of FIG. 10A. Similar to the first infrared location mask 850, the third infrared location mask 1050 includes a first value (e.g., a "0") to indicate locations 852 of visible light pixels (e.g., the green pixel 802a, the blue pixels 802b, and the red pixels 802c). The third infrared location mask 1050 also includes a second value (e.g., a "1") to indicate locations 854 of infrared light pixels (e.g., the infrared pixels 802d). In the illustrated example, the third example spectral pattern 1000 also includes phase detection pixels 802e. As described above, the density of the phase detection pixels may indicate that the image sensor is additionally a sparse phase detection pixel image sensor. In some such examples, the third infrared location mask 1050 may also use the second value (e.g., a "1") to indicate locations 856 of phase detection pixels (e.g., the phase detection pixels 802e). Although the locations 856 corresponding to the phase detection pixels are included in the third infrared location mask 1050, it should be appreciated that the locations 856 corresponding to the phase detection pixels may be included in a different mask (e.g., a phase detection location mask). Furthermore, in some examples, the third infrared location mask 1050 may use a third value (e.g., a "2") to indicate locations 856 of phase detection pixels (e.g., the phase detection pixels 802e).

FIG. 11B illustrates a fourth infrared location mask 1150 that corresponds to the fourth example spectral pattern 1100 of FIG. 11A. Similar to the first infrared location mask 850, the fourth infrared location mask 1150 includes a first value (e.g., a "0") to indicate locations 852 of visible light pixels (e.g., the green pixel 802a, the blue pixels 802b, and the red pixels 802c). The fourth infrared location mask 1150 also includes a second value (e.g., a "1") to indicate locations 854 of infrared light pixels (e.g., the infrared pixels 802d).

In some examples, the infrared location masks 850, 950, 1050, 1150 may be stored in a data structure, such as a look-up table, or in a register accessible to the processing unit 620. For example, the infrared location masks 850, 950, 1050, 1150 may be stored in the system memory 624 and/or the internal memory 621.

Additionally, the example IR pixel correction component 698 may be configured to replace a missing visible light spectral value with the generated spectral value. For example, the IR pixel correction component 698 may replace infrared light data 618b associated with an infrared pixel with the respective generated spectral values.

It should be appreciated that the generated spectral values are based on the spectral pattern. For example, while the image mosaic 618 includes the visible light data 618a and the infrared light data 618b, the IR pixel correction component 698 may use the infrared location mask to determine the locations of the infrared pixels 802d (and, in some examples, the phase detection pixels 802e) and operate as if the data provided for the respective locations were provided by a pixel with a missing visible light spectral value. Thus, the IR pixel correction component 698 may be configured to operate to ignore the presence of any infrared pixels 802d (and/or phase detection pixels 802e) and, instead, is configured to operate as if each pixel is a visible light pixel (e.g., the green pixel 802a, the blue pixel 802b, or the red pixel 802c). The IR pixel correction component 698 may then generate the spectral value for the respective pixel based on the respective spectral pattern. For example, if the infrared pixel was not present, then the data provided by the corresponding pixel location may correspond to a red pixel. In some such examples, the IR pixel correction component 698 may then generate a red spectral value for the respective pixel based on one or more neighboring red pixels that did provide visible light data 618a. Accordingly, it should be appreciated that the IR pixel correction component 698 may be configured to operate as if the image sensor did not include any infrared pixels.

In some examples, after the processing unit 620 corrects the spectral values for the pixel locations corresponding to the IR pixels, the example processing unit 620 may then perform demosaicing techniques on the image mosaic 618 to generate the RGB image. It should be appreciated that the processing unit 620 and/or the image processing pipeline 607 may perform additional or alternative techniques for generating the RGB image. For example, the processing unit 620 and/or the image processing pipeline 607 may perform post-processing functions, such as depth mapping and/or Bokeh effect. In some examples, the processing unit 620 may also facilitate performing cropping, scaling (e.g., to a different resolution), image stitching, image format conversion, color interpolation, color processing, image filtering (e.g., spatial image filtering), lens artifact or defect correction, sharpening, or the like.

As described herein, a device, such as the device 604, may refer to any device, apparatus, or system configured to perform one or more techniques described herein. For example, a device may be a server, user equipment, a client device, a station, an access point, a computer (e.g., a personal computer, a desktop computer, a laptop computer, a tablet computer, a computer workstation, or a mainframe computer), an end product, an apparatus, a phone, a smart phone, a video game platform or console, a handheld device (e.g., a portable video game device or a personal digital assistant (PDA)), a wearable computing device (e.g., a smart watch, an augmented reality device, or a virtual reality device), a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., an ISP), but, in further embodiments, can be performed using other components (e.g., a CPU), consistent with disclosed embodiments.

It should be appreciated that the device 604 may include one or more additional optical components mounted inside a housing of the device 604 and/or positioned on the housing of the optical system 610. For example, the additional optical components may include a motion sensor (e.g., an accelerometer, a gyroscope, etc.), apertures, shutters, mirrors, filters, coatings, etc.

Figure 12:
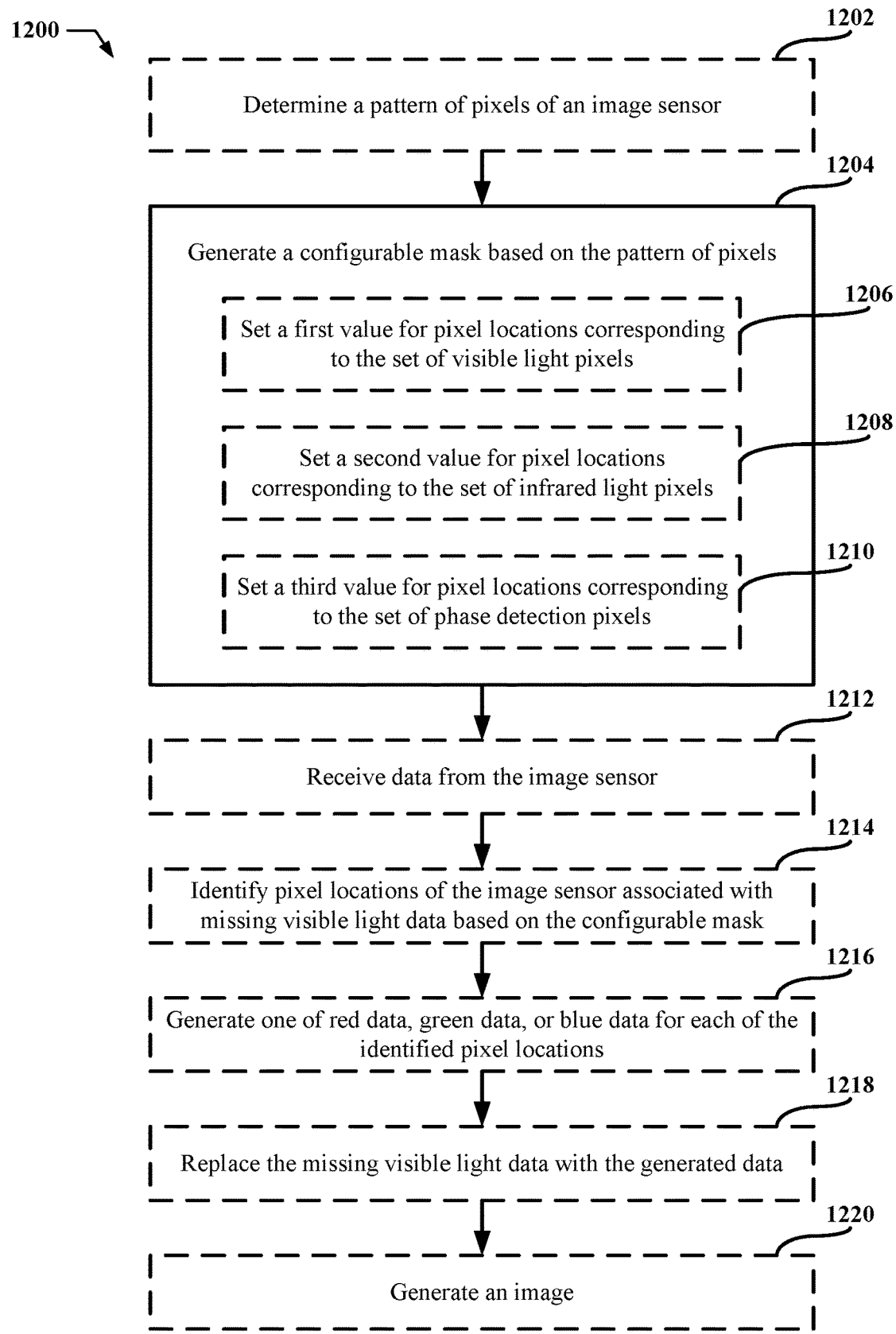
FIG. 12 illustrates an example flowchart of an example method, in accordance with one or more techniques of this disclosure.

FIG. 12 illustrates an example flowchart 1200 of an example method in accordance with one or more techniques of this disclosure. The method may be performed by an apparatus, such as the device 604 of FIG. 6, a DPU, a GPU, a video processor, and/or a component of the device 604, such as the processing unit 620 and/or the IR pixel correction component 698. According to various aspects, one or more of the illustrated operations of the methods may be omitted, transposed, and/or contemporaneously performed. Optional aspects are illustrated with a dashed line.

At 1202, the apparatus may determine a pattern of pixels of an image sensor, as described in connection with the examples of FIGS. 1 to 10 and/or 11. For example, the IR pixel correction component 698 may be configured to determine the pattern of pixels of the image sensor. In some examples, the pattern of pixels may include a set of visible light pixels and a set of infrared light pixels, such as the spectral patterns 800, 900, 1100 of FIGS. 8A, 9A, and 11A.

In some examples, the pattern of pixels may include a set of visible light pixels, a set of infrared light pixels, and a set of phase detection pixels, such as the spectral pattern 1000 of FIG. 10A. In some examples, the apparatus may determine the pattern of pixels based on a data structure providing the pixel locations of the visible light pixels, the infrared light pixels, and/or the phase detection pixels. In some examples, the apparatus may determine the pattern of pixels by comparing a first frame captured with a flood illuminator and/or a time-of-flight sensor enabled and a second frame captured with the flood illuminator and/or the time-of-flight sensor disabled.

At 1204, the apparatus generates a configurable mask based on a pattern of pixels of an image sensor, as described in connection with the examples of FIGS. 1 to 10 and/or 11. For example, the IR pixel correction component 698 may be configured to generate the configurable mask. For example, the apparatus may generate the infrared location masks 850, 950, 1050, 1150 of FIGS. 8B, 9B, 10B, 11B based on the spectral patterns 800, 900, 1000, 1100 of FIGS. 8A, 9A, 10A, 11B, respectively.

In some examples, values of the configurable mask may correspond to pixel locations of the image sensor. For example, at 1206, the apparatus may set a first value for pixel locations corresponding to the set of visible light pixels (e.g., the green pixels 802a, the blue pixels 802b, and the red pixels 802c). At 1208, the apparatus may set a second value for pixel locations corresponding to the set of infrared light pixels (e.g., the infrared pixels 802d). At 1210, the apparatus may set a third value for pixel locations corresponding to the set of phase detection pixels (e.g., the phase detection pixels 802e). In some examples, the second value associated with the infrared pixels and the third value associated with the phase detection pixels may be the same value. In some examples, the second value associated with the infrared pixels and the third value associated with the phase detection pixels may be different values.

At 1212, the apparatus may receive data from the image sensor, as described in connection with the examples of FIGS. 1 to 10 and/or 11. For example, the IR pixel correction component 698 may be configured to receive data from the image sensor. In some examples, the data may comprise the image mosaic 618 including visible light data 618a, infrared light data 618b, and/or phase detection data. In some examples, the received data may be associated with an RGB pattern. In some examples, the RGB pattern may be a Bayer pattern or a Quadra pattern. In some examples, the RGB pattern is a spectral pattern that is compatible with demosaicing techniques available to the apparatus for generating an RGB image.

At 1214, the apparatus may identify pixel locations of the image sensor associated with missing visible light data based on the configurable mask, as described in connection with the examples of FIGS. 1 to 10 and/or 11. For example, the IR pixel correction component 698 may be configured to identify the pixels locations of the image sensor associated with missing visible light data based on the configurable mask. For example, the apparatus may use the values of the configurable mask to determine pixel locations corresponding infrared pixels 802d and/or phase detection pixels 802e. For example, the apparatus may determine the locations of the respective pixels based on the infrared location masks 850, 950, 1050, 1150.

At 1216, the apparatus may generate one of red data, green data, or blue data for each of the identified pixel locations, as described in connection with the examples of FIGS. 1 to 10 and/or 11. For example, the IR pixel correction component 698 may be configured to generate one of red data, green data, or blue data for each of the identified pixel locations. In some examples, the apparatus may generate the red data, the green data, or the blue data based on interpolation of corresponding visible light data from at least two neighboring visible light pixels. In some examples, the apparatus may apply pixel correction techniques to generate one of red data, green data, or blue data. In some examples, the pixel correction techniques may include estimating (or interpolating) a spectral value for an identified pixel based on classifier classifications (e.g., gradient classifiers) and/or statistical measurements, such as variance and/or standard deviation of spectral values neighboring the respective pixel. For example, the apparatus may determine, based on the RGB pattern, the spectral characteristic for the identified pixel (e.g., the spectral value for identified pixel is to be a red spectral value). In some examples, the apparatus may generate a red spectral value for the respective pixel based on one or more neighboring red pixels of the image sensor 614.

In some examples, the apparatus may generate the spectral value by taking an average spectral value of the neighboring pixels associated with the same spectral characteristic (e.g., one or more neighboring red pixels).

It should be appreciated that for a first pixel, the neighboring pixels are those pixels that have the same spectral characteristic as the first pixel (e.g., are both red pixels) and are within a threshold distance from the first pixel (e.g., are less than two pixels away from the first pixel, are less than three pixels away from the first pixel, etc.). In some examples, the neighboring pixels may be one or more same spectral characteristic pixels that are horizontal to the first pixel, may be one or more same spectral characteristic pixels that are vertical to the first pixel, may be one or more same spectral characteristic pixels that are 45 degrees diagonal to the first pixel, and/or may be one or more same spectral characteristic pixels that are 135 degrees diagonal to the first pixel.

In some examples, the apparatus may generate the spectral value for an identified pixel by calculating a gradient for one or more same spectral characteristic pixels for the different directions (e.g., horizontal, vertical, 45 degrees diagonal, and/or 135 degrees diagonal), selecting a direction based on the calculated gradients, and determining a spectral value for the identified pixel along the selected direction using the neighboring same spectral characteristic pixels.

However, it should be appreciated that other techniques for generating the spectral value for the identified pixel to correct the spectral value for the identified pixel may additionally or alternatively be used. Furthermore, it should be appreciated that the techniques for generating the spectral values for the identified pixels may be the same techniques regardless of whether the respective pixel corresponds to a phase detection pixel or an infrared pixel.

It should be appreciated that in some examples, the visible light data may include IR contamination. In some such examples, the apparatus may be configured to remove the IR contamination from the visible light data before the generating of the spectral value. In some examples, the apparatus may determine whether the amount of IR contamination is within an acceptable threshold and determine to remove the IR contamination when the amount of IR contamination is not within the acceptable threshold.

At 1218, the apparatus may replace the missing visible light data with the generated data, as described in connection with the examples of FIGS. 1 to 10 and/or 11. For example, the IR pixel correction component 698 may be configured to replace the missing visible light data with the generated data.

In some examples, the apparatus may replace the infrared light data and/or the phase detection data associated with the locations corresponding to the identified pixels with the generated red data, the green data, or the blue data. It should be appreciated that after the replacing of the data of the image mosaic associated with the identified pixels, the image mosaic includes visible light data (e.g., red data, green data, and/or blue data) captured and received from the image sensor 614 for the visible light pixels of the image sensor 614 (e.g., the green pixels 802*a*, the blue pixels 802*b*, and the red pixels 802*c*) and generated red data, green data, and/or blue data for the locations corresponding to the infrared light pixels (e.g., the infrared pixels 802*d*) and/or the phase detection pixels (e.g., the phase detection pixels 802*e*).

At 1220, the apparatus may generate an image, as described in connection with the examples of FIGS. 1 to 10 and/or 11. For example, the IR pixel correction component 698 may be configured to generate the image. In some examples, the apparatus may demosaic the image mosaic to generate the image. In some examples, the apparatus may generate an RGB image based on the visible light data and the generated red data, green data, or blue data. In some examples, the apparatus may generate an infrared image based on the infrared light data. In some examples, the apparatus may generate an RGB image based on the visible light data, the phase detection data, and the generated red data, green data, or blue data corresponding to the identified pixel locations associated with the set of infrared light pixels.

In one configuration, a method or apparatus for image processing is provided. The apparatus may be a processing unit, an ISP, a DPU, a GPU, a video processor, or some other processor that can perform image processing. In some examples, the apparatus may be the processing unit 120 within the device 104, or may be some other hardware within the device 104, or another device. The apparatus may include means for generating, at a processor coupled to an image sensor, a configurable mask based on a pattern of pixels of the image sensor, where values of the configurable mask correspond to pixel locations of the image sensor, and where the image sensor comprises a pattern of pixels including a set of visible light pixels and a set of infrared light pixels, the image sensor configured to generate visible light data and infrared light data based on received light. The apparatus may also include means for setting a first value for pixel locations corresponding to the set of visible light pixels. The apparatus may also include means for setting a second value for pixel locations corresponding to the set of infrared light pixels. The apparatus may also include means for receiving the light at an optical system, the optical system including a dual band pass filter including a first band configured to allow visible light to pass through the optical system to the image sensor and a second band configured to allow infrared light to pass through the optical system to the image sensor. The apparatus may also include means for receiving the visible light data and the infrared light data from the image sensor for a frame. The apparatus may also include means for identifying pixel locations of the image sensor associated with missing visible light data based on the configurable mask. The apparatus may also include means for generating, based on the visible light data and a red, green, blue (RGB) pattern, one of red data, green data, or blue data for each of the identified pixel locations of the image sensor. The apparatus may also include means for generating the red data, the green data, or the blue data based on interpolation of corresponding visible light data from at least two neighboring visible light pixels. The apparatus may also include means for generating an RGB image for the frame based on the visible light data and the generated red data, green data, or blue data. The apparatus may also include means for generating an infrared image for the frame based on the infrared light data. The apparatus may also include means for receiving, at the processor, phase detection data from the image sensor, wherein the image sensor further includes a set of phase detection pixels. The apparatus may also include means for setting a first value for pixel locations corresponding to the set of visible light pixels. The apparatus may also include means for setting a second value for pixel locations corresponding to the set of infrared light pixels. The apparatus may also include means for setting a third value for pixel locations corresponding to the set of phase detection pixels. The apparatus may also include means for receiving the visible light data, the infrared light data, and the phase detection data from the image sensor for a frame. The apparatus may also include means for identifying pixel locations of the image sensor associated with missing visible light data based on the configurable mask. The apparatus may also include means for generating, based on the visible light data and a red, green, blue (RGB) pattern, one of red data, green data, or blue data for each of the identified pixel locations of the image sensor. The apparatus may also include means for generating an RGB image for the frame based on the visible light data, the phase detection data, and the generated red data, green data, or blue data corresponding to identified pixel locations associated with the set of infrared light pixels.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatus, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus, comprising:
   an image sensor comprising a set of visible light pixels and a set of infrared light pixels, the image sensor configured to generate visible light data and infrared light data based on received light; and
   a processor coupled to the image sensor and configured to:
     capture a first frame with a flood projector enabled;
     capture a second frame with the flood projector disabled;
     determine locations of the set of visible light pixels and the set of infrared light pixels based on a spectral pattern to identify a pattern of pixels of the image sensor, the spectral pattern determined based on a comparison of the first frame and the second frame; and
     generate a configurable mask including values corresponding to spectral values associated with respective pixel locations based on the pattern of pixels of the image sensor, the spectral values indicating at least one of visible light pixels and infrared light pixels.

2. The apparatus of claim 1, wherein to generate the configurable mask, the processor is configured to:
   set a first value for first pixel locations corresponding to the set of visible light pixels; and
   set a second value for second pixel locations corresponding to the set of infrared light pixels.

3. The apparatus of claim 1, further comprising:
   an optical system for receiving the received light, the optical system including a dual band pass filter including a first band configured to allow visible light to pass through the optical system to the image sensor and a second band configured to allow infrared light to pass through the optical system to the image sensor.

4. The apparatus of claim 1, wherein the processor is further configured to:
   receive the visible light data and the infrared light data from the image sensor for a third frame;
   identify pixel locations of the image sensor associated with missing visible light data based on the configurable mask; and
   generate, based on the visible light data and a red, green, blue (RGB) pattern, one of generated red data, generated green data, or generated blue data for each of the pixel locations of the image sensor associated with the missing visible light data.

5. The apparatus of claim 4, wherein the processor is configured to generate the generated red data, the generated green data, or the generated blue data based on interpolation of corresponding visible light data from at least two neighboring visible light pixels.

6. The apparatus of claim 4, wherein the processor is further configured to generate an RGB image for the third frame based on the visible light data and the generated red data, the generated green data, or the generated blue data.

7. The apparatus of claim 4, wherein the processor is further configured to generate an infrared image for the third frame based on the infrared light data.

8. The apparatus of claim 4, wherein the processor is configured to remove infrared light contamination from the visible light data before generating the generated red data, the generated green data, or the generated blue data for the pixel locations of the image sensor associated with the missing visible light data.

9. The apparatus of claim 1, wherein the image sensor further includes a set of phase detection pixels, and the image sensor is further configured to generate phase detection data based on the received light.

10. The apparatus of claim 9, wherein to generate the configurable mask, the processor is further configured to:
    determine locations of the set of phase detection pixels of the image sensor;
    set a first value for first pixel locations corresponding to the set of visible light pixels;
    set a second value for second pixel locations corresponding to the set of infrared light pixels; and
    set a third value for third pixel locations corresponding to the set of phase detection pixels.

11. The apparatus of claim 10, wherein the second value and the third value are a same value.

12. The apparatus of claim 10, wherein the second value and the third value are different values.

13. The apparatus of claim 9, wherein the processor is further configured to:
    receive the visible light data, the infrared light data, and the phase detection data from the image sensor for a third frame;
    identify pixel locations of the image sensor associated with missing visible light data based on the configurable mask; and
    generate, based on the visible light data and a red, green, blue (RGB) pattern, one of generated red data, generated green data, or generated blue data for each of the pixel locations of the image sensor associated with the missing visible light data.

14. The apparatus of claim 13, wherein the processor is further configured to generate an RGB image for the third frame based on the visible light data, the phase detection data, and the generated red data, the generated green data, or the generated blue data corresponding to identified pixel locations associated with the set of infrared light pixels.

15. The apparatus of claim 1, wherein the processor is configured to determine the locations of the set of visible light pixels and the set of infrared light pixels based on a data structure including the spectral pattern of the image sensor.

16. The apparatus of claim 15, further comprising:
a communication interface configured to access the data structure including the spectral pattern of the image sensor.

17. The apparatus of claim 15, wherein the processor is further configured to:
capture a third frame with a time-of-flight sensor enabled;
capture a fourth frame with the time-of-flight sensor disabled;
determine a second spectral pattern of the image sensor based on a comparison of the third frame and the fourth frame; and
populate the data structure based on the second spectral pattern.

18. The apparatus of claim 1, wherein the processor is configured to generate the configurable mask when the image sensor is installed at the apparatus.

19. A method of image processing, comprising:
capturing a first frame with a flood projector enabled;
capturing a second frame with the flood projector disabled;
determining, at a processor coupled to an image sensor, locations of visible light pixels and infrared light pixels of the image sensor based on a spectral pattern to identify a pattern of pixels of the image sensor, the spectral pattern determined based on a comparison of the first frame and the second frame; and
generating, at the processor, a configurable mask including values corresponding to spectral values associated with respective pixel locations based on the pattern of pixels of the image sensor, the spectral values indicating at least one of a visible light and an infrared light, and
the image sensor comprising the pattern of pixels including a set of visible light pixels and a set of infrared light pixels, the image sensor configured to generate visible light data and infrared light data based on received light.

20. The method of claim 19, wherein generating the configurable mask includes:
setting a first value for first pixel locations corresponding to the set of visible light pixels; and
setting a second value for second pixel locations corresponding to the set of infrared light pixels.

21. The method of claim 19, further comprising receiving the received light at an optical system, the optical system including a dual band pass filter including a first band configured to allow visible light to pass through the optical system to the image sensor and a second band configured to allow infrared light to pass through the optical system to the image sensor.

22. The method of claim 19, further comprising:
receiving the visible light data and the infrared light data from the image sensor for a third frame;
identifying pixel locations of the image sensor associated with missing visible light data based on the configurable mask; and
generating, based on the visible light data and a red, green, blue (RGB) pattern, one of generated red data, generated green data, or generated blue data for each of the pixel locations of the image sensor associated with the missing visible light data.

23. The method of claim 22, wherein generating the generated red data, the generated green data, or the generated blue data is based on interpolation of corresponding visible light data from at least two neighboring visible light pixels.

24. The method of claim 22, further comprising generating an RGB image for the third frame based on the visible light data and the generated red data, the generated green data, or the generated blue data.

25. The method of claim 22, further comprising generating an infrared image for the third frame based on the infrared light data.

26. The method of claim 19, further comprising:
receiving, at the processor, phase detection data from the image sensor, wherein the image sensor further includes a set of phase detection pixels.

27. The method of claim 26, wherein generating the configurable mask includes:
determining locations of the set of phase detection pixels of the image sensor;
setting a first value for first pixel locations corresponding to the set of visible light pixels;
setting a second value for second pixel locations corresponding to the set of infrared light pixels; and
setting a third value for third pixel locations corresponding to the set of phase detection pixels.

28. The method of claim 26, further comprising:
receiving the visible light data, the infrared light data, and the phase detection data from the image sensor for a third frame;
identifying pixel locations of the image sensor associated with missing visible light data based on the configurable mask; and
generating, based on the visible light data and a red, green, blue (RGB) pattern, one of generated red data, generated green data, or generated blue data for each of the pixel locations of the image sensor associated with the missing visible light data.

29. The method of claim 28, further comprising generating an RGB image for the third frame based on the visible light data, the phase detection data, and the generated red data, the generated green data, or the generated blue data corresponding to identified pixel locations associated with the set of infrared light pixels.

30. An apparatus, comprising:
an optical system for receiving light, the optical system including an image sensor comprising a set of visible light pixels and a set of infrared light pixels, the image sensor configured to generate visible light data and infrared light data based on received light; and
a processor coupled to the image sensor and configured to:
capture a first frame with a flood projector enabled;
capture a second frame with the flood projector disabled;
determine locations of the set of visible light pixels and the set of infrared light pixels based on a spectral pattern to identify a pattern of pixels of the image sensor, the spectral pattern determined based on a comparison of the first frame and the second frame; and
generate a configurable mask including values corresponding to spectral values associated with respective pixel locations based on the pattern of pixels of the image sensor, the spectral values indicating at least one of visible light pixels and infrared light pixels.

\* \* \* \* \*